(12) United States Patent
Onggosanusi et al.

(10) Patent No.: US 10,951,382 B2
(45) Date of Patent: *Mar. 16, 2021

(54) METHOD AND APPARATUS FOR CSI REPORTING

(71) Applicant: Samsung Electronics Co., Ltd., Suwon-si (KR)

(72) Inventors: Eko Onggosanusi, Coppell, TX (US); Hongbo Si, Plano, TX (US); Young-Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,498

(22) Filed: Oct. 17, 2019

(65) Prior Publication Data

US 2020/0052863 A1 Feb. 13, 2020

Related U.S. Application Data

(63) Continuation of application No. 16/278,614, filed on Feb. 18, 2019, which is a continuation of application
(Continued)

(51) Int. Cl.
*H04B 7/06* (2006.01)
*H04L 5/00* (2006.01)
(Continued)

(52) U.S. Cl.
CPC ......... *H04L 5/0057* (2013.01); *H04B 7/0626* (2013.01); *H04B 7/0632* (2013.01);
(Continued)

(58) Field of Classification Search
CPC .... H04B 7/0626; H04B 7/0632; H04B 7/063; H04L 1/0693; H04L 5/0057; H04L 47/821
See application file for complete search history.

(56) References Cited

U.S. PATENT DOCUMENTS 9,414,249 B2 8/2016 Hooli et al.
9,515,711 B2 12/2016 Yum et al.
(Continued)

FOREIGN PATENT DOCUMENTS

| CN | 103891377 | 6/2014 |
|---|---|---|
| EP | 2662987 A2 | 11/2013 |
| WO | 2015016512 A1 | 2/2015 |

OTHER PUBLICATIONS

First Office Action in connection with Chinese Application No. 201680044304.5 dated Aug. 4, 2020, 19 pages.
(Continued)

*Primary Examiner* — Salvador E Rivas

(57) ABSTRACT

For CSI reporting mechanisms, a user equipment (UE) includes a transceiver and a processor operably connected to the transceiver. The transceiver is configured to receive channel state information (CSI) process configuration information including at least one beamformed type associated with a plurality of non-zero-power (NZP) CSI reference signal (CSI-RS) resource configurations and receive a CSI-RS resource index (CRI) reporting configuration. The processor is configured to calculate, in response to receipt of the configuration information, a CRI and a channel quality indicator (CQI). The transceiver is further configured to report the CRI and the CQI by transmitting the CRI and the CQI on an uplink channel.

15 Claims, 14 Drawing Sheets

Related U.S. Application Data

No. 15/214,274, filed on Jul. 19, 2016, now Pat. No. 10,211,964.

(60) Provisional application No. 62/198,434, filed on Jul. 29, 2015, provisional application No. 62/220,061, filed on Sep. 17, 2015, provisional application No. 62/244,472, filed on Oct. 21, 2015, provisional application No. 62/280,924, filed on Jan. 20, 2016.

(51) Int. Cl.

| | | |
|---|---|---|
| *H04W 72/04* | (2009.01) | |
| *H04W 72/06* | (2009.01) | |
| H04L 25/03 | (2006.01) | |
| H04W 52/14 | (2009.01) | |
| H04L 12/911 | (2013.01) | |
| H04W 72/08 | (2009.01) | |

(52) U.S. Cl.
CPC .......... *H04L 5/0048* (2013.01); *H04L 5/0094* (2013.01); *H04W 72/0413* (2013.01); *H04W 72/06* (2013.01); H04L 5/0007 (2013.01); H04L 25/03923 (2013.01); H04L 47/821 (2013.01); H04W 52/146 (2013.01); H04W 72/085 (2013.01)

(56) References Cited

U.S. PATENT DOCUMENTS

| | | | |
|---|---|---|---|
| 10,211,964 B2* | 2/2019 | Onggosanusi | H04B 7/0626 |
| 2013/0301448 A1 | 11/2013 | Sayana et al. | |
| 2013/0308715 A1 | 11/2013 | Nam et al. | |
| 2014/0192917 A1 | 7/2014 | Nam et al. | |
| 2016/0352482 A1* | 12/2016 | Sun | H04L 5/0057 |
| 2018/0124624 A1* | 5/2018 | Chen | H04B 7/0643 |
| 2019/0182013 A1* | 6/2019 | Onggosanusi | H04L 5/0057 |

OTHER PUBLICATIONS

Communication under Rule 71(3) EPC Intention to grant in connection with European Application No. 18176533.0 dated Aug. 24, 2020, 80 pages.

3GPP TS 36.211 V124.0 (Dec. 2014), Technical Specification, 3rd Generation Partnership Project, Technical Specification Group Radio Access Network, Evolved Universal Terrestrial Radio Access (E-UTRA), Physical channels and modulation (Release 12) Dec. 2014, 124 pages.

3GPP TS 36.212 V123.0 (Dec. 2014), Technical Specification, 3rd Generation Partnership Project, Technical Specification Group Radio Access Network, Evolved Universal Terrestrial Radio Access (E-UTRA), Multiplexing and channel coding (Release 12) Dec. 2014, 89 pages.

3GPP TS 36.213 V124.0 (Dec. 2014), Technical Specification, 3rd Generation Partnership Project, Technical Specification Group Radio Access Network, Evolved Universal Terrestrial Radio Access (E-UTRA), Physical layer 3rocedures (Release 12) Dec. 2014, 225 pages.

3GPP TS 36331 V124.0 (Dec. 2014), Technical Specification, 3rd Generation Partnership Project, Technical Specification Group Radio Access Network, Evolved Universal Terrestrial Radio Access (E-UTRA), Radio Resource Control (RRC); Protocol specification (Release 12) Dec. 2014, 408 pages.

Intellectual Property India, Examination Report regarding Application No. 201817001971, dated Nov. 27, 2020, 5 pages.

* cited by examiner

METHOD AND APPARATUS FOR CSI REPORTING

CROSS-REFERENCE TO RELATED APPLICATIONS

The present application is a continuation of U.S. Non-Provisional patent application Ser. No. 16/278,614 filed on Feb. 18, 2019 and entitled METHOD AND APPARATUS FOR CSI REPORTING, which is a continuation of U.S. Non-Provisional patent application Ser. No. 15/214,274 filed Jul. 19, 2016, now U.S. Pat. No. 10,211,964, which claims the benefit of U.S. Provisional Patent Application Ser. No. 62/198,434 filed Jul. 29, 2015; U.S. Provisional Patent Application Ser. No. 62/244,472 filed Oct. 21, 2015; U.S. Provisional Patent Application Ser. No. 62/220,061 filed Sep. 17, 2015; and U.S. Provisional Patent Application Ser. No. 62/280,924 filed Jan. 20, 2016. The above-identified provisional patent applications are hereby incorporated by reference in their entirety.

TECHNICAL FIELD

The present disclosure relates generally to channel state information (CSI) reporting for multiple transmit antennas which includes two dimensional arrays. Such two dimensional arrays can be associated with a type of multiple-input multiple-output (MIMO) system often termed "full-dimension" MIMO (FD-MIMO) or massive MIMO or 3D-MIMO. The present disclosure also relates generally to downlink synchronization for narrow band communication systems.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CSI reporting.

In one embodiment, a user equipment (UE) is provided. The UE includes a transceiver and a processor operably connected to the transceiver. The transceiver is configured to receive channel state information (CSI) process configuration information including at least one beamformed type associated with a plurality of non-zero-power (NZP) CSI reference signal (CSI-RS) resource configurations and receive a CSI-RS resource index (CRI) reporting configuration. The processor is configured to calculate, in response to receipt of the configuration information, a CRI and a channel quality indicator (CQI). The transceiver is further configured to report the CRI and the CQI by transmitting the CRI and the CQI on an uplink channel.

In another embodiment, a base station (BS) is provided. The BS includes a processor and a transceiver operably connected to the processor. The processor is configured to generate configuration information to configure a UE with a CSI process including at least one beamformed type associated with a plurality of NZP CSI-RS resource configurations and generate configuration information to configure a UE with CRI reporting. The transceiver configured to transmit the configuration information for the CSI process, the NZP CSI-RS resources, and the CRI reporting and receive a CRI report and a CQI report on an uplink channel.

In another embodiment, a method for operating a UE is provided. The method includes receiving, by the UE, CSI) process configuration information including at least one beamformed type associated with a plurality of NZP CSI-RS resource configurations. The method also includes receiving a CRI reporting configuration and, in response to receipt of the configuration information, calculating, by the UE, a CRI and a CQI. Additionally, the method includes reporting the CRI and the CQI by transmitting the CRI and the CQI on an uplink channel.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
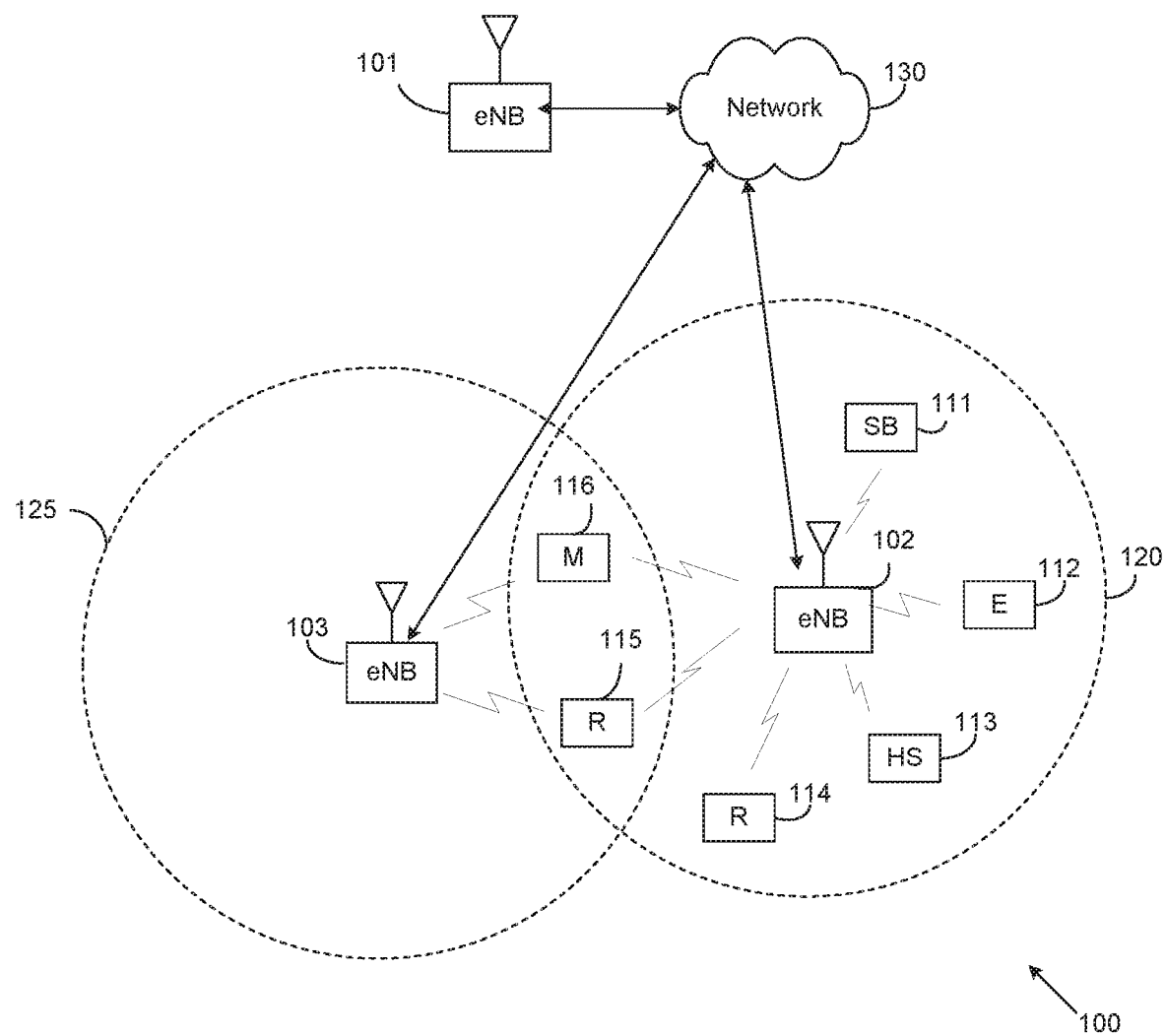
FIG. 1 illustrates an example wireless network according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); and 3GPP TS 36.331 version 12.4.0, "E-UTRA, Radio Resource Control (RRC) Protocol Specification" ("REF 4").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes an eNB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Depending on the network type, other well-known terms can be used instead of "eNB" or "BS," such as "base station" or "access point." For the sake of convenience, the terms "eNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of eNB 101, eNB 102, and eNB 103 configure UEs 111-116 for CSI reporting as described in embodiments of the present disclosure. In various embodiments, one or more of UEs 111-116 perform calculation and reporting for of CSI.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
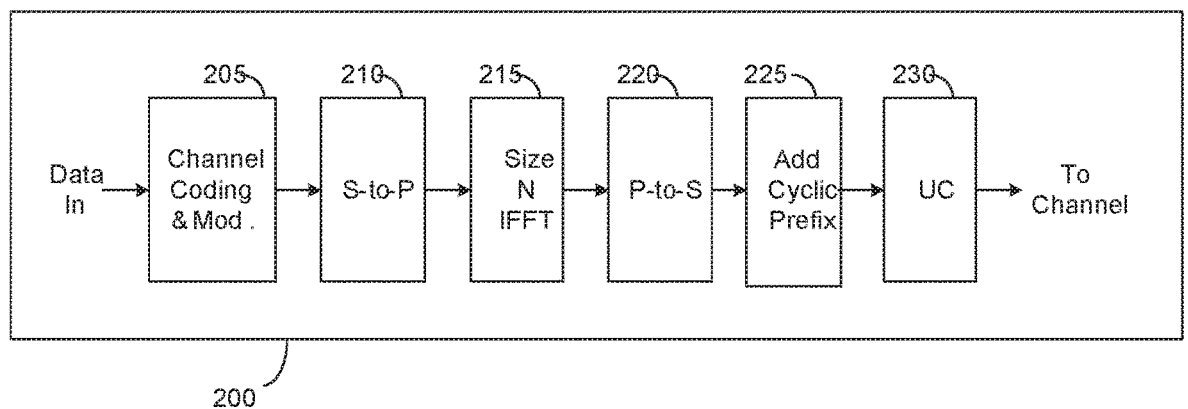
FIGS. 2A and 2B illustrate example wireless transmit and receive paths according to various embodiments of the present disclosure.
Figure 2B:
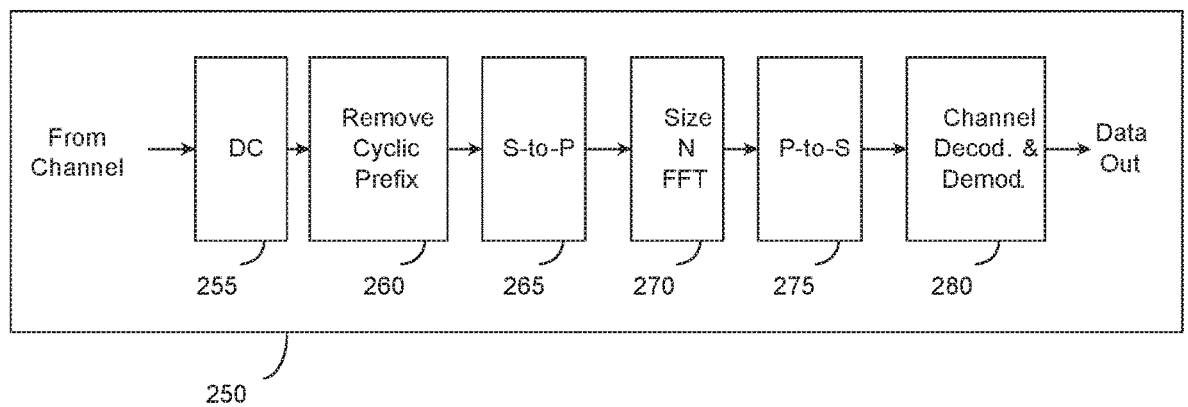

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to support channel quality measurement and reporting for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
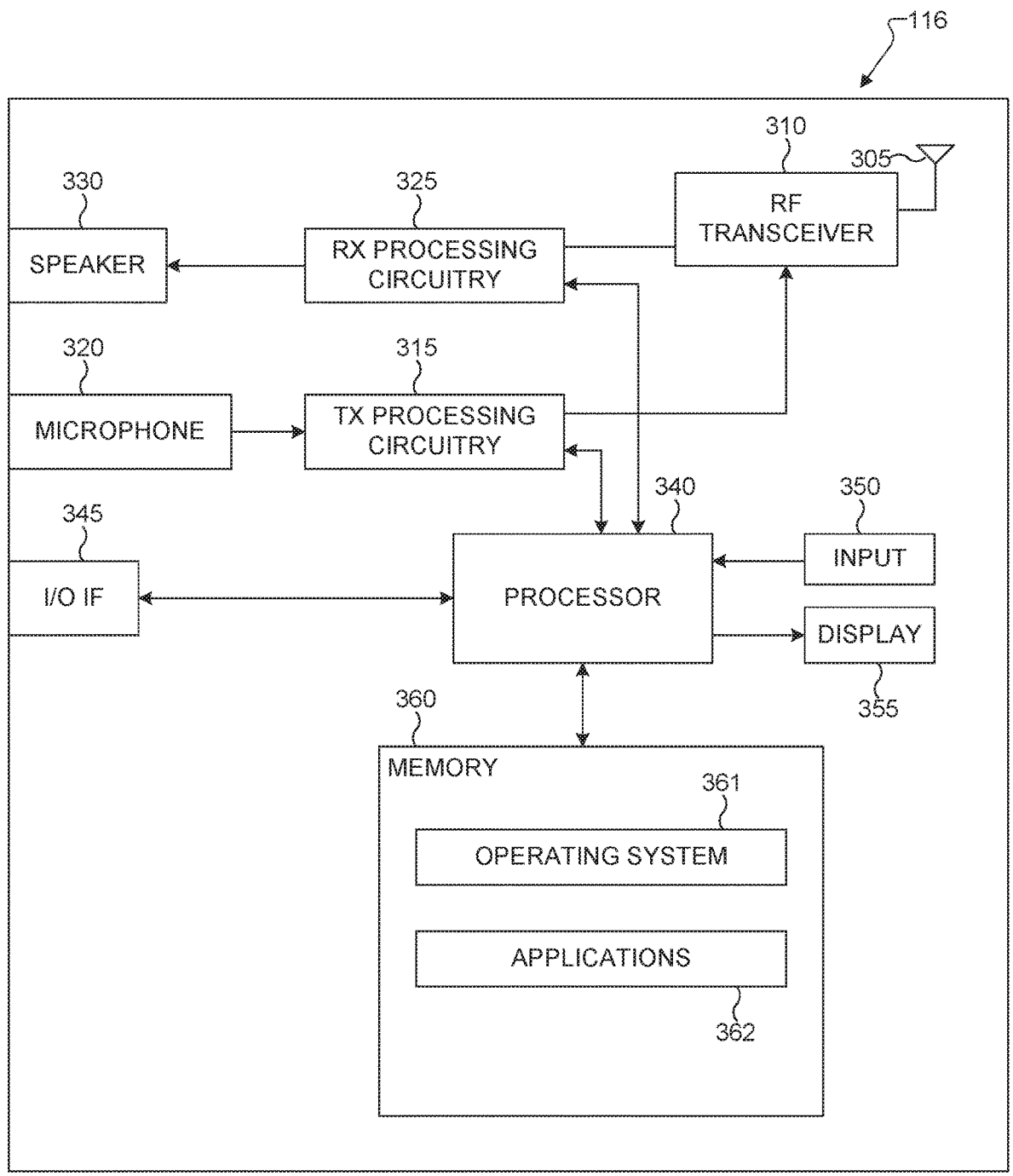
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
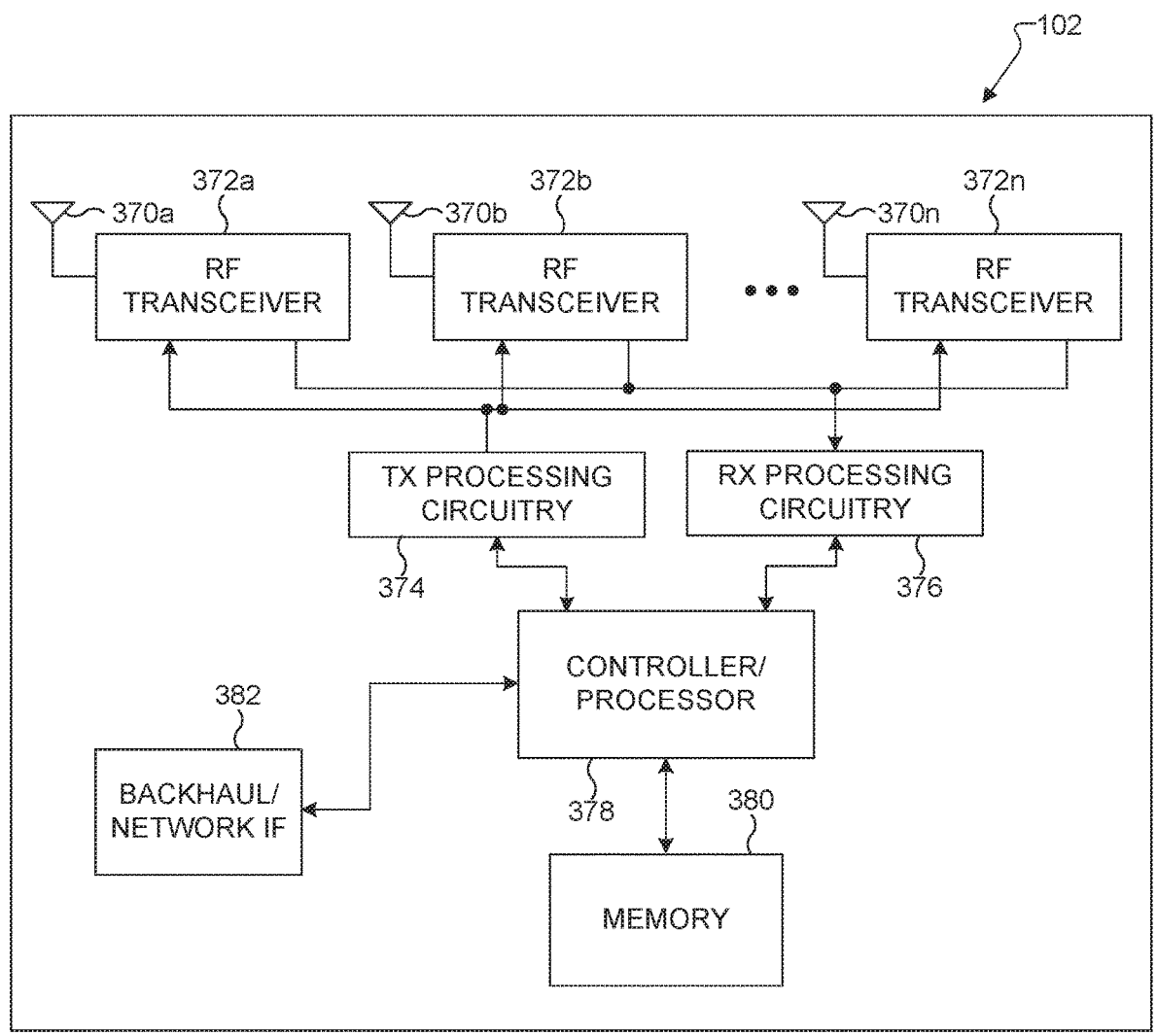
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3A. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
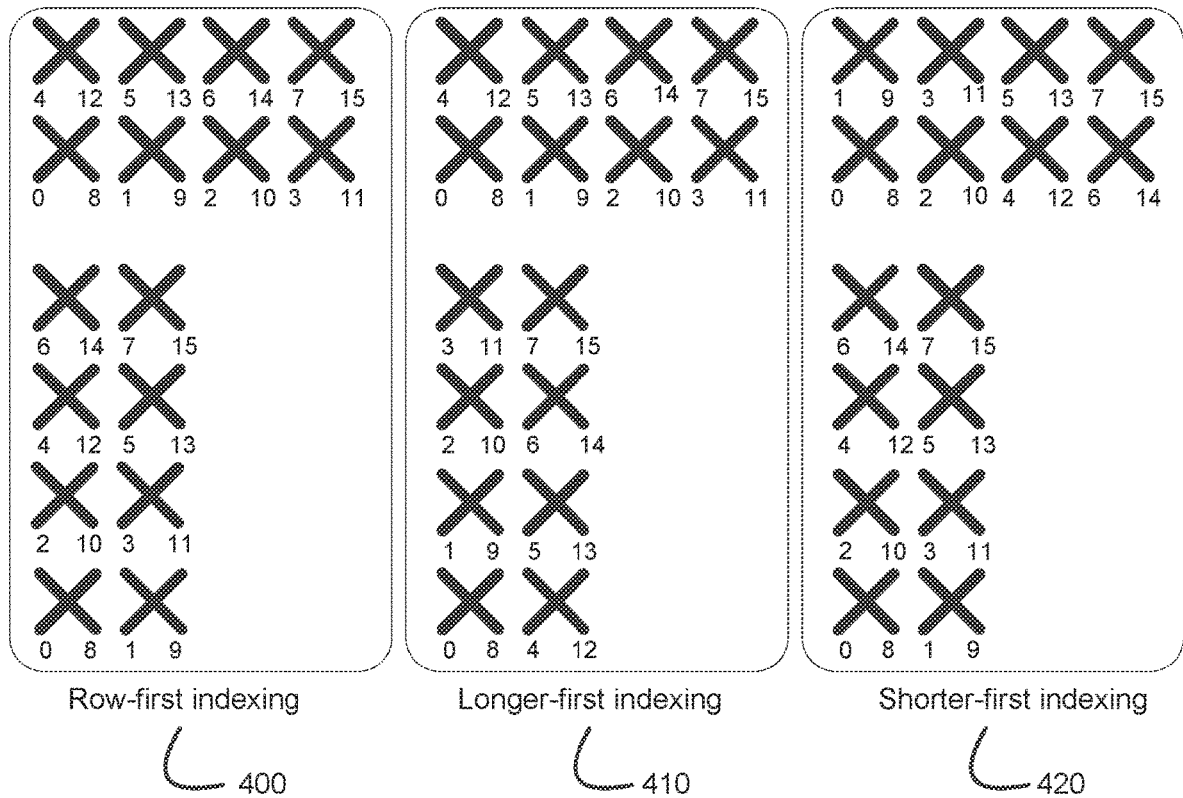
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 illustrates example two-dimensional (2D) antenna arrays constructed from 16 dual-polarized elements arranged in a 4×2 or 2×4 rectangular format which can be utilized in various embodiments of the present disclosure. In this illustrative embodiment, the 2D dual-polarized antenna port array includes $M_a$ rows and $N_a$ columns where $(M_a, N_a)=(2,4)$ and $(4,2)$. The embodiment of the 2D dual-polarized antenna port array shown in FIG. 4 is for illustration only. Other embodiments of the 2D dual-polarized antenna port array could be used without departing from the scope of the present disclosure.

The example 2D dual-polarized antenna port array arrangement results in a total of $2M_aN_a=16$ ports, each mapped to one CSI-RS port. The three indexings 400, 410, and 420 are three examples in indexing the 16 antenna ports as a means of mapping antenna ports to precoding matrix elements. For row-first indexing 400, antenna ports associated with the same polarization group are indexed in a row-first manner regardless of $(M_a, N_a)$. For longer-first indexing 410, antenna ports associated with the same polarization group are indexed in a column-first manner when $M_a>N_a$, but row-first manner when $M_a \leq N_a$. For shorter-first indexing 420, antenna ports associated with the same polarization group are indexed in a row-first manner when $M_a>N_a$, but column-first manner when $M_a \leq N_a$. Indexing 400 is therefore termed row-first indexing while indexing 410 longer-first indexing and indexing 420 shorter-first indexing.

In these illustrative embodiments, both $M_a$ and $N_a$ can be configured by an eNB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

In legacy LTE systems, precoding codebooks are utilized for CSI reporting. Two categories of CSI reporting modes are supported: PUSCH-based aperiodic CSI (A-CSI) and PUCCH-based periodic CSI (P-CSI). In each category, different modes are defined based on frequency selectivity of CQI and/or PMI, that is, whether wideband (one CSI parameter calculated for all the "set S subbands") or subband (one CSI parameter calculated for each "set S subband") reporting is performed. The supported CSI reporting modes are given in TABLES 1 and 2.

TABLE 1

CQI and PMI Feedback Types for PUSCH (Aperiodic) CSI Reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

CQI and PMI Feedback Types for PUCCH (Periodic) CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

The following embodiments relate generally to channel state information (CSI) reporting for multiple transmit antennas which includes two dimensional arrays.

A precoding matrix or a precoder, which can be used by an eNB (such as 102) to perform short-term precoding for transmitting to a UE and assumed by a UE to derive a CSI report, can be described as a dual-stage precoding matrix:

$$W=W_1W_2 \qquad \text{(Equation 1)}$$

Referring to FIG. 4, the size of the precoding matrix W is $N_{TX} \times N_L$ where $N_{TX}=2M_aN_a$ is the total number of antenna or CSI-RS ports and $N_L$ is the number of transmission layers (also termed the rank). The first-stage precoder $W_1$ pertains to a long-term component and is associated with long-term channel statistics. In addition, $W_1$ is wideband (the same $W_1$ for all the set S subbands). The second-stage precoder $W_2$ pertains to a short-term component which performs selection, co-phasing, or any linear operation to $W_1$. Therefore, the number of columns of $W_1$ can be perceived as the number of basis vectors $N_b$ for $W_2$. In addition, $W_2$ can be either wideband (the same $W_2$ for all the set S subbands) or subband (one $W_2$ for each set S subband).

For 2D (two-dimensional) rectangular port array, each of the first and the second stage precoders can be described as a Kronecker product of a first and a second precoder. In the present disclosure, $A \otimes B$ denotes the Kronecker product between two matrices A and B. This example embodiment is termed the full Kronecker Product (full KP) codebook. The subscripts m and n in $W_{m,n}(i_{m,n})$ denote precoding stage (first or second) and dimension (first or second, such as vertical or horizontal), respectively. Each of the precoders $W_{m,n}$ is a function of an index which serves as a PMI component. Thus, the precoding matrix W can be described in terms of 4 PMI components $i_{1,1}, i_{1,2}, i_{2,1}, i_{2,2}$ as follows.

$$W(i_{1,1}, i_{1,2}, i_{2,1}, i_{2,2}) = \qquad \text{(Equation 2)}$$
$$(W_{1,1}(i_{1,1})W_{2,1}(i_{2,1})) \otimes (W_{1,2}(i_{1,2})W_{2,2}(i_{2,2})) =$$
$$(W_{1,1}(i_{1,1}) \otimes W_{1,2}(i_{1,2}))(W_{2,1}(i_{2,1}) \otimes W_{2,2}(i_{2,2}))$$

Given a precoding codebook (a set of precoding matrices $W(i_{1,1}, i_{1,2}, i_{2,1}, i_{2,2})$), a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102. This PMI represents an index of a recommended precoding matrix in the precoding codebook. Different precoding codebooks can be used for different values of RI.

Another example embodiment assumes that a precoder in a designated codebook can be described in (3), termed the partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ is a function of an index which serves as a PMI component. Thus, the precoding matrix W can be described as a function of 3 PMI components $i_{1,1}$, $i_{1,2}$, $i_2$ as follows.

$$W(i_{1,1},i_{1,2},i_2)=(W_{1,1}(i_{1,1})\otimes W_{1,2}(i_{1,2}))(W_2(i_2)) \quad \text{(Equation 3)}$$

Similar to the previous codebook embodiment, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102.

The above description of embodiments is especially suitable when the serving eNB transmits non-precoded CSI-RS (NP CSI-RS). That is, a cell-specific one-to-one mapping between CSI-RS port and TXRU (transceiver unit) is utilized. Here, different CSI-RS ports have the same wide beam width and direction and hence generally cell wide coverage. Another type of CSI-RS applicable to FD-MIMO is beamformed CSI-RS (BF CSI-RS). For example, beamforming operation, either cell-specific or UE-specific, is applied on a non-zero-power (NZP) CSI-RS resource (including multiple ports). Here, at least at a given time/frequency CSI-RS ports have narrow beam widths and hence not cell wide coverage, and (at least from the eNB perspective) at least some CSI-RS port-resource combinations have different beam directions. This beamforming operation is intended to increase CSI-RS coverage or penetration. In addition, when UE-specific beamforming is applied to a CSI-RS resource (termed the UE-specific or UE-specifically beamformed CSI-RS), CSI-RS overhead reduction can be obtained when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNB, the UE can be configured to report PMI parameters associated with $W_2$ ($W_{2,1}$ and/or $W_{2,2}$) without $W_1$ ($W_{1,1}$ and/or $W_{1,2}$).

Each of the above CSI-RS configurations requires a different transmission strategy which potentially requires a different CSI reporting format for a configured CSI reporting mode. In addition to these factors, the 2D pattern of codebook mapped to CSI-RS ports also determines the CSI reporting format. In particular, a flexible configuration mechanism which allows a serving eNB to configure a UE with NP CSI-RS and UE-specific BF CSI-RS on a subframe basis is beneficial. This can improve system performance through CSI-RS overhead reduction, inter-cell interference reduction, and coverage improvement.

In addition, another CSI parameter (beside CQI, PMI, and RI) can be introduced to enable beam or NZP CSI-RS resource selection for the so-called cell-specific beamformed CSI-RS (or enhanced vertical or virtual sectorization). This parameter is termed beam index (BI) for exemplary and illustrative purposes. This scheme utilizes either multiple CSI processes or multiple NZP CSI-RS resources for CSI reporting where one CSI process or NZP CSI-RS resource is associated with a beam (or a virtual sector). A beam is defined as a collection of CSI-RS antenna ports. In this scheme, a UE measures each of the beams (or virtual sectors), calculates, and reports CSI for each beam (and hence each CSI process or NZP CSI-RS resource). The UE reports a beam index BI which informs the eNB of a recommended beam selection. In the present disclosure, this beam index is denoted as $i_b$ for illustrative purposes. If K>1 NZP CSI-RS resources (configured for or associated with one CSI process) correspond to K>1 beams or virtual sectors, beam selection is essentially NZP CSI-RS resource selection. Hence, the term CSI-RS resource index (CRI) can be used instead of beam index (BI). These two terms can be used interchangeably in the present disclosure.

Therefore, for PUCCH-based periodic CSI reporting or PUSCH-based aperiodic CSI reporting, a CSI report can include the following CSI parameters: 1) RI, 2) CQI associated with one (for RI=1) or two codewords (RI>1), 3) PMI values: $\{i_{1,1},i_{1,2},i_{2,1},i_{2,2}\}$ or $\{i_{1,1},i_{1,2},i_2\}$ or $\{i_1, i_2\}$ for non-precoded CSI-RS (or a selected beam or NZP CSI-RS resource in cell-specific beamformed CSI-RS); $\{i_{2,1},i_{2,2}\}$ or $\{i_2\}$ for UE-specific beamformed CSI-RS, 4) BI: $i_b$ In terms of CSI reporting overhead, the beam index (BI) is reported at a low rate. In addition, one BI can be sufficient for all the subbands. If K>1 NZP CSI-RS resources (configured for or associated with one CSI process) are used, BI requires $\lfloor \log_2 (K) \rfloor$ bits. For instance, for K=2 and 8, a BI report can occupy 1 and 3 bits, respectively. As FD-MIMO requires larger codebook sizes, the Rel.12 periodic CSI reporting on PUCCH (which supports up to 11 bits per reporting instance with PUCCH format 2/2a/2b) cannot be reused. For example, PMI reporting for 8-port CSI-RS is heavily truncated due to codebook subsampling. Enforcing a more aggressive codebook sub sampling on 12- or 16-port CSI-RS will reduce the potential gain of FD-MIMO when periodic CSI reporting is used. Partitioning PMI values across multiple subframes is not desirable since partitioning increases inter-subframe dependence and increases the susceptibility of CSI reporting to error propagation and dropped CSI reports. Therefore, there is a need to design a periodic CSI reporting scheme for BI or CRI feedback based on PUCCH.

The various embodiments in this disclosure are applicable when multiple (K>1) beams are configured for a UE. In particular, it is applicable when K>1 NZP CSI-RS resources (configured for or associated with one CSI process) are used such that BI or CRI requires $\lfloor \log_e (K) \rfloor$ bits. The embodiments of in this disclosure are described as an extension of PERIODIC PUCCH-based reporting mode 1-1 although these embodiments are equally applicable to periodic PUCCH-based reporting mode 2-1. Therefore, the reported CQI and PMI are wideband (calculated assuming transmission on "the set S subbands"). Furthermore, since beam selection is expected to vary slowly and not frequency selective, BI or CRI is also wideband (calculated assuming transmission on "the set S subbands"). For example, if RI is reported, RI is calculated conditioned on the last reported periodic CRI. In addition, CQI is calculated conditioned at least on the last reported periodic RI and the last reported periodic BI (or CRI). If RI is not reported, CQI is calculated conditioned at least on the last reported periodic BI (or CRI).

Terms such as 'non-precoded' (or 'NP') CSI-RS and 'beamformed' (or 'BF') CSI-RS are used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially these two CSI-RS types are a first CSI-RS and a second CSI-RS. In another example, CSI-RS resource type can be used to differentiate those two modes of operation instead of CSI-RS type. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are examples and can be substituted with other labels such as '1' and '2', or 'A' and 'B', or TYPE1 and TYPE2, or CLASS-A and CLASS-B. In another example, a MIMO type or eMIMO-Type which can be associated with CSI reporting operation can be used to differentiate those two modes of operation instead of CSI-RS type. For example, a UE is configured with a MIMO type or eMIMO-Type associated with CSI reporting behaviors and, in addition, CSI measurement behaviors.

Several embodiments are given for BI reporting in relation to CQI, RI, and PMI.

Figure 5A:
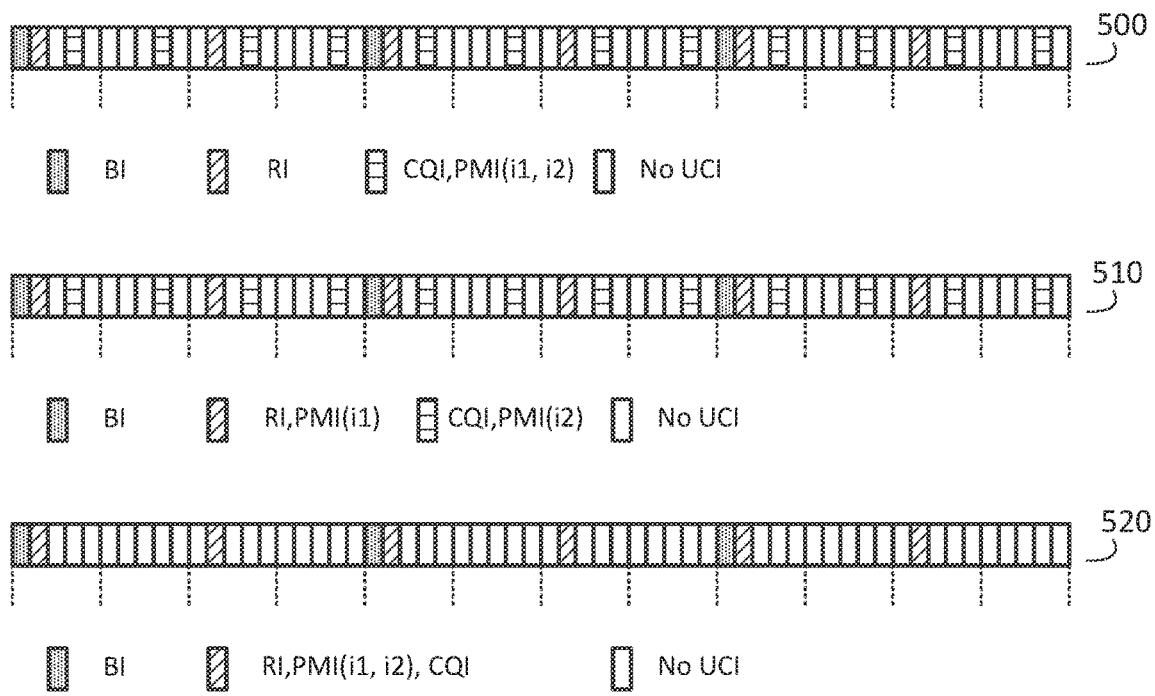
FIG. 5A illustrates an example of beam index (BI) reporting wherein BI is reported separately from CQI, PMI, and RI according to various embodiments of the present disclosure.

In a first embodiment, BI is reported separately from (in a different set of subframes or a different set of slots) CQI, PMI, and RI. FIG. 5A illustrates an example of this first embodiment. For illustrative purposes, the reporting periodicity of BI is set to be twice as that for RI and the reporting periodicity of RI twice as that for other CSI parameters (when applicable). The subframe offset values in FIG. 5A are also for illustrative purposes. In all the three examples, BI is reported in a separate subframe. In a first example reporting scheme 500, RI is reported apart from CQI and PMI. It can be seen as an extension of periodic CSI reporting mode 1-1 submode 2 in Rel.12 LTE. In a second example reporting scheme 510, RI is reported together with a first PMI $i_1$. It can be seen as an extension of periodic CSI reporting mode 1-1 submode 1. In a third example reporting scheme 520, RI is reported together with a first and second PMI $i_1$ and $i_2$ as well as CQI. It can be seen as a new submode of periodic CSI reporting mode 1-1 where a different PUCCH format (for instance, format 3 or 4 PUCCH, periodic reporting on PUSCH) with larger payload capacity can be used. For this first embodiment, BI can be reported using PUCCH format 1/1a/1b or 2/2a/2b. In all these examples, RI is calculated conditioned on the last reported periodic CRI. In addition, CQI is calculated conditioned on at least the last reported periodic RI and CRI.

Figure 5B:
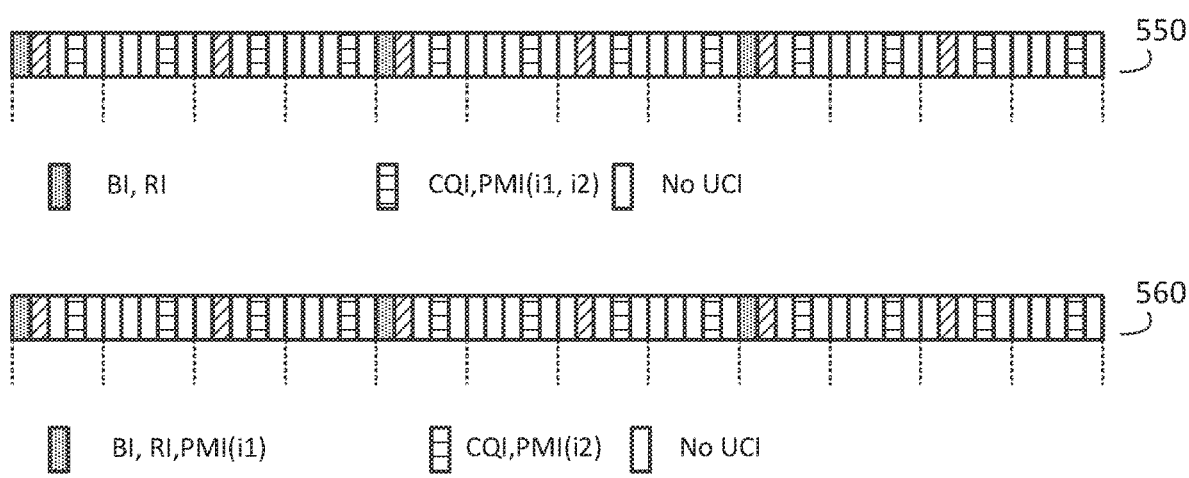
FIG. 5B illustrates an example of beam index (BI) reporting wherein BI, whenever reported, is reported together with RI according to various embodiments of the present disclosure.

In a second embodiment, BI, whenever reported, is reported together with (jointly in a same subframe or slot as) RI. This implies that when BI is reported in a subframe or a slot, it is accompanied with RI. But depending on the reporting interval configuration, an RI report can be accompanied with BI or not. FIG. 5B illustrates two exemplary schemes pertaining to this embodiment. For illustrative purposes, the reporting periodicity of BI is set to be twice as that for RI and the reporting periodicity of RI twice as that for other CSI parameters (when applicable). The subframe offset values in FIG. 5B are also for illustrative purposes. In the first example reporting scheme 550, BI is reported together with RI and separately from CQI and PMI. It can be seen as an extension of periodic CSI reporting mode 1-1 submode 2. The combination of BI and RI can be reported using PUCCH format 2/2a/2b. In the second example reporting scheme 560, BI is reported together with RI and the first PMI $i_1$, and separately from CQI and the second PMI $i_2$. It can be seen as an extension of periodic CSI reporting mode 1-1 submode 1. The combination of BI, RI, and the first PMI $i_1$ can be reported using PUCCH format 2/2a/2b or another PUCCH format (for instance, format 3 or 4 PUCCH, periodic reporting on PUSCH) which can support a larger payload. In all these examples, RI is calculated conditioned on the last reported periodic CRI. In addition, CQI is calculated conditioned on at least the last reported periodic RI and CRI.

In all the above descriptions and equations, if the term CRI (CSI-RS resource indicator) is used instead of BI (beam indicator), all designations with BI are replaced with CRI.

To configure a UE with PUCCH-based periodic BI reporting, periodicity and subframe offset parameters can be defined. At least two BI reporting configurations can be used. In a first configuration, BI reporting is defined relative to RI reporting. In a second configuration, BI reporting is defined relative to CQI reporting.

The first configuration, BI reporting defined relative to RI reporting, is applicable when beam selection is expected to vary approximately at the same rate as or slower than transmission rank, BI reporting can be defined relative to RI reporting.

To configure BI reporting for periodic PUCCH-based CSI reporting, subframe offset and periodicity are configured. At least two example options can be used. In a first example, the periodicity of BI is configured to be identical to that of RI. A UE can either support both options and therefore be configured with one of these two options, or support only one of these two options (for example, when only one of these two options is supported in specification(s)). In a second example, the periodicity of BI is configured to be a multiple of that of RI. Each of these two examples can be described differently for the aforementioned example reporting schemes (500, 510, 520, 550, and 560 in FIG. 5A and FIG. 5B).

The following description applies for the embodiment shown by reporting scheme 500 wherein BI is reported separately from CQI, PMI, and RI. The reporting instances for wideband CQI/PMI are subframes satisfying:

$$(10 \times n_f + \lfloor n_s/2 \rfloor - N_{OFFSET,CQI}) \bmod (N_{pd}) = 0 \quad \text{(Equation 4)}$$

Here $n_f$, $n_s$, $N_{OFFSET,CQI}$, and $N_{pd}$ are frame index/number, slot index/number, subframe offset for CQI/PMI reporting (in subframes), and periodicity/reporting interval (in subframes) for CQI/PMI reporting. When two PMI values ($i_1$, $i_2$) are applicable, PMI reporting consists of both $i_1$ and $i_2$. For example, if RI reporting is configured, the reporting interval of the RI reporting is an integer multiple $M_{RI}$ of period $N_{pd}$ (in subframes). The reporting instances for RI are subframes satisfying:

$$(10 \times n_f + \lfloor n_s/2 \rfloor - N_{OFFSET,CQI} - N_{OFFSET,RI}) \bmod (N_{pd} \times M_{RI}) = 0 \quad \text{(Equation 5)}$$

Here $N_{OFFSET,RI}$ is subframe offset for RI reporting (in subframes) relative to CQI/PMI reporting.

If BI reporting configured, at least two example options exist in terms of the reporting interval of BI in relation to the reporting interval of RI. In the first example, the reporting interval of the BI reporting is the same as that for RI. Then the reporting instances for BI are subframes satisfying:

$$(10 \times n_f + \lfloor n_s/2 \rfloor - N_{OFFSET,CQI} - N_{OFFSET,RI} - N_{OFFSET,BI}) \bmod (N_{pd} \times M_{RI}) = 0 \quad \text{(Equation 6)}$$

Here $N_{OFFSET,BI}$ is subframe offset for BI reporting (in subframes) relative to RI reporting. In the second example, the reporting interval of the BI reporting is a multiple of that for RI. Then the reporting instances for BI are subframes satisfying:

$$(10 \times n_f + \lfloor n_s/2 \rfloor - N_{OFFSET,CQI} - N_{OFFSET,RI} - N_{OFFSET,BI}) \bmod (N_{pd} \times M_{RI}) = 0 \quad \text{(Equation 7)}$$

A UE can either support both options and therefore be configured with one of these two options, or support only one of these two options (for example, when only one of these two options is supported in specification(s)).

The following description applies for the embodiment shown by reporting scheme 510 wherein BI is reported separately from CQI, PMI, and RI. The description in equation 4 is applicable for wideband CQI and PMI2 (the second PMI $i_2$) which are reported together. The description in equation 5 is applicable for RI and wideband PMI1 (the first PMI $i_1$) which are reported together. The description in equation 6 or 7 is applicable for BI reporting depending on whether the reporting interval of the BI reporting is the same as or a multiple of that for RI.

The following description applies for the embodiment shown by reporting scheme 520 wherein BI is reported separately from CQI, PMI, and RI. The description in equation 4 is applicable for wideband CQI, PMI (when applicable, including both the first PMI $i_1$ and the second PMI $i_2$), and RI which are reported together when RI reporting is configured. If RI reporting is not configured, only wideband CQI and PMI (when applicable, including both the first PMI $i_1$ and the second PMI are reported.

When BI reporting is configured, at least two example options exist in terms of the reporting interval of BI in relation to the reporting interval of RI (hence CQI and PMI). In the first example, the reporting interval of the BI reporting is the same as that for RI (hence CQI and PMI). Then the reporting instances for BI are subframes satisfying:

$$(10 \times n_f + \lfloor n_s/2 \rfloor - N_{OFFSET,CQI} - N_{OFFSET,BI}) \bmod(N_{pd}) = 0 \quad \text{(Equation 8)}$$

Here $N_{OFFSET,BI}$ is subframe offset for BI reporting (in subframes) relative to RI (hence CQI and PMI) reporting. In the second example, the reporting interval of the BI reporting is a multiple of that for RI (hence CQI and PMI). Then the reporting instances for BI are subframes satisfying:

$$(10 \times n_f + \lfloor n_s/2 \rfloor - N_{OFFSET,CQI} - N_{OFFSET,BI}) \bmod(N_{pd} \times M_{BI}) = 0 \quad \text{(Equation 9)}$$

A UE can either support both options and therefore be configured with one of these two options, or support only one of these two options (for example, when only one of these two options is supported in specification(s)).

The following description applies for the embodiment shown by reporting scheme 550 wherein BI, whenever reported, is reported together with (jointly in a same subframe as) RI. The reporting instances for wideband CQI/PMI are subframes satisfying $$(10 \times n_f + \lfloor n_s/2 \rfloor - N_{OFFSET,CQI}) \bmod(N_{pd}) = 0 \quad \text{(Equation 10)}$$

Here $n_f$, $n_s$, $N_{OFFSET,CQI}$, and $N_{pd}$ are frame index/number, slot index/number, subframe offset for CQI/PMI reporting (in subframes), and periodicity/reporting interval (in subframes) for CQI/PMI reporting. When two PMI values ($i_1$, $i_2$) are applicable, PMI reporting consists of both $i_1$ and $i_2$. For example, if RI reporting is configured, the reporting interval of the RI reporting is an integer multiple $M_{RI}$ of period $N_{pd}$ (in subframes). The reporting instances for RI are subframes satisfying:

$$(10 \times n_f + \lfloor n_s/2 \rfloor - N_{OFFSET,CQI} - N_{OFFSET,RI}) \bmod(N_{pd} \times M_{RI}) = 0 \quad \text{(Equation 11)}$$

Here $N_{OFFSET,RI}$ is subframe offset for RI reporting (in subframes) relative to CQI/PMI reporting.

For example, if BI reporting configured, at least two example options exist in terms of the reporting interval of BI in relation to the reporting interval of RI. In the first example, the reporting interval of the BI reporting is the same as that for RI. Then the reporting instances for BI are subframes satisfying equation 11 since BI and RI are reported together. In the second example, the reporting interval of the BI reporting is a multiple of that for RI. Then the reporting instances for BI are subframes satisfying:

$$(10 \times n_f + \lfloor n_s/2 \rfloor - N_{OFFSET,CQI} - N_{OFFSET,RI}) \bmod(N_{pd} \times M_{RI} \times M_{BI}) = 0 \quad \text{(Equation 12)}$$

A UE can either support both options and therefore be configured with one of these two options, or support only one of these two options (for example, when only one of these two options is supported in specification(s)).

The following description applies for the embodiment shown by reporting scheme 560 wherein BI, whenever reported, is reported together with (jointly in a same subframe as) RI. The description in equation 10 is applicable for wideband CQI and PMI2 (the second PMI $i_2$) which are reported together. The description in equation 11 is applicable for RI and wideband PMI1 (the first PMI $i_1$) which are reported together. The description in equation 11 or equation 12 is applicable for BI reporting depending on whether the reporting interval of the BI reporting is the same as or a multiple of that for RI.

All the above descriptions also apply when PMI reporting is not configured (that is, CSI reporting without PMI). For example, each reporting instance in equation 4 to equation 12 where CQI and/or RI is reported together with at least one PMI value is applicable with PMI reporting removed.

Just as CQI and RI, so the reporting configuration for BI is configured via higher-layer (RRC) signaling analogous to the description in Section 7.2.2 of REF3.

TABLE 3 describes an exemplary mapping between the configuration index for BI reporting $I_{BI}$ to $M_{BI}$ and $N_{OFFSET,BI}$ associated with the description in equation 7. This example defines a set of possible subframe offset values in terms of the maximum reporting interval of RI (which is $32 \times 160 = 5120$ subframes). In this example, the maximum value of $M_{BI}$ is assumed to be 8, 16, or 32. Extension to cases with different maximum value of $M_{BI}$ or different set of $M_{BI}$ values is straightforward for those familiar with the art.

TABLE 3

Mapping of $I_{BI}$ to $M_{BI}$ and $N_{OFFSET, BI}$ - defined relative to RI reporting, three examples with variations

| $I_{BI}$ | Value of $M_{BI}$ | Value of $N_{OFFSET, BI}$ |
|---|---|---|
| (A) | | |
| $0 \leq I_{BI} \leq 5120$ | 1 | $-I_{BI}$ |
| $5121 \leq I_{BI} \leq 10241$ | 2 | $-(I_{BI} - 5121)$ |
| $10242 \leq I_{BI} \leq 15362$ | 4 | $-(I_{BI} - 10242)$ |
| $15363 \leq I_{BI} \leq 20483$ | 8 | $-(I_{BI} - 15363)$ |
| $20484 \leq I_{BI} \leq 32767$ | | Reserved |
| (B) | | |
| $0 \leq I_{BI} \leq 5120$ | 1 | $-I_{BI}$ |
| $5121 \leq I_{BI} \leq 10241$ | 2 | $-(I_{BI} - 5121)$ |
| $10242 \leq I_{BI} \leq 15362$ | 4 | $-(I_{BI} - 10242)$ |
| $15363 \leq I_{BI} \leq 20483$ | 8 | $-(I_{BI} - 15363)$ |
| $20484 \leq I_{BI} \leq 25604$ | 16 | $-(I_{BI} - 20484)$ |
| $25605 \leq I_{BI} \leq 32767$ | | Reserved |
| (C) | | |
| $0 \leq I_{BI} \leq 5120$ | 1 | $-I_{BI}$ |
| $5121 \leq I_{BI} \leq 10241$ | 2 | $-(I_{BI} - 5121)$ |
| $10242 \leq I_{BI} \leq 15362$ | 4 | $-(I_{BI} - 10242)$ |
| $15363 \leq I_{BI} \leq 20483$ | 8 | $-(I_{BI} - 15363)$ |
| $20484 \leq I_{BI} \leq 25604$ | 16 | $-(I_{BI} - 20484)$ |
| $25605 \leq I_{BI} \leq 30725$ | 32 | $-(I_{BI} - 25605)$ |
| $30726 \leq I_{BI} \leq 32767$ | | Reserved |
| (D) | | |
| $0 \leq I_{BI} \leq 5120$ | 2 | $-I_{BI}$ |
| $5121 \leq I_{BI} \leq 10241$ | 4 | $-(I_{BI} - 5121)$ |
| $10242 \leq I_{BI} \leq 15362$ | 8 | $-(I_{BI} - 10242)$ |
| $15363 < I_{BI} \leq 20483$ | 16 | $-(I_{BI} - 15363)$ |
| $20484 \leq I_{BI} \leq 25604$ | 32 | $-(I_{BI} - 20484)$ |
| $25605 \leq I_{BI} \leq 32767$ | | Reserved |
| (E) | | |

TABLE 3-continued

Mapping of $I_{BI}$ to $M_{BI}$ and $N_{OFFSET, BI}$ - defined relative to RI reporting, three examples with variations

| $I_{BI}$ | Value of $M_{BI}$ | Value of $N_{OFFSET, BI}$ |
|---|---|---|
| (F) | | |
| $0 \leq I_{BI} \leq 5120$ | 4 | $-I_{BI}$ |
| $5121 \leq I_{BI} \leq 10241$ | 8 | $-(I_{BI} - 5121)$ |
| $10242 \leq I_{BI} \leq 15362$ | 16 | $-(I_{BI} - 10242)$ |
| $15363 \leq I_{BI} \leq 20483$ | 32 | $-(I_{BI} - 15363)$ |
| $20484 \leq I_{BI} \leq 32767$ | Reserved | |
| | | |
| $0 \leq I_{BI} \leq 5120$ | 4 | $-I_{BI}$ |
| $5121 \leq I_{BI} \leq 10241$ | 8 | $-(I_{BI} - 5121)$ |
| $10242 \leq I_{BI} \leq 15362$ | 16 | $-(I_{BI} - 10242)$ |
| $15363 \leq I_{BI} \leq 16383$ | Reserved | |

TABLE 4 describes an exemplary mapping between the configuration index for BI reporting $I_{BI}$ to $M_{BI}$ associated with the description in equation 12 where BI is reported in a subframe containing RI. In this example, the maximum value of is assumed to be 8, 16, or 32. Extension to cases with different maximum value of $M_{BI}$ or different set of $M_{BI}$ values is straightforward for those familiar with the art.

TABLE 4

Mapping of $I_{BI}$ to $M_{BI}$ and $N_{OFFSET, BI}$ - defined relative to RI reporting, three examples with variations

| $I_{BI}$ | Value of $M_{BI}$ |
|---|---|
| (A) | |
| 0 | 1 |
| 1 | 2 |
| 2 | 4 |
| 3 | 8 |
| (B) | |
| 0 | 1 |
| 1 | 2 |
| 2 | 4 |
| 3 | 8 |
| 4 | 16 |
| $5 \leq I_{BI} \leq 7$ | Reserved |
| (C) | |
| 0 | 1 |
| 1 | 2 |
| 2 | 4 |
| 3 | 8 |
| 4 | 16 |
| 5 | 32 |
| $6 \leq I_{BI} \leq 7$ | Reserved |
| (D) | |
| 0 | 2 |
| 1 | 4 |
| 2 | 8 |
| 3 | 16 |
| 4 | 32 |
| $5 \leq I_{BI} \leq 7$ | Reserved |
| (E) | |
| 0 | 4 |
| 1 | 8 |
| 2 | 16 |
| 3 | 32 |
| (F) | |
| 0 | 4 |
| 1 | 8 |
| 2 | 16 |
| 3 | Reserved |

TABLE 5 describes an exemplary mapping between the configuration index for BI reporting $I_{BI}$ to $N_{OFFSET,BI}$ associated with the description in equation 6. This example defines a set of possible subframe offset values in terms of the maximum reporting interval of RI (which is 32×160=5120 subframes).

TABLE 5

Mapping of $I_{BI}$ to $M_{BI}$ and $N_{OFFSET, BI}$ - defined relative to RI reporting

| $I_{BI}$ | Value of $N_{OFFSET, BI}$ |
|---|---|
| $0 \leq I_{BI} \leq 5120$ | $-I_{BI}$ |
| $5121 \leq I_{BI} \leq 8191$ | Reserved |

In all the above descriptions and equations, if the term CRI (CSI-RS resource indicator) is used instead of BI (beam indicator), all designations with BI are replaced with CRI. For example, $I_{BI}$, $M_{BI}$, and $N_{OFFSET,BI}$ are replaced with $I_{CRI}$, $M_{CRI}$, and $N_{OFFSET,CRI}$, respectively.

The second configuration, BI reporting defined relative to CQI reporting, is applicable since a UE can be configured for CQI reporting without RI. For example, when CQI is calculated conditioned on transmission rank of one, or when the number of antenna ports in each configured CSI-RS resource is one, or when RI reporting is turned off. For example, BI reporting can still be instrumental. Therefore, instead of configuring BI reporting relative to RI reporting, BI reporting can be configured relative to CQI reporting (accompanied with PMI when applicable). For example, CQI is calculated conditioned on the last reported periodic CRI.

To configure BI reporting for periodic PUCCH-based CSI reporting, subframe offset and periodicity are configured. At least two example options can be used. In a first example, the periodicity of BI is configured to be the identical to that of RI. In a second example, the periodicity of BI is configured to be a multiple of that of RI. Each of these two examples can be described differently for the aforementioned example reporting schemes (500, 510, 520, 550, and 560 in FIG. 5A and FIG. 5B). A UE can either support both options and therefore be configured with one of these two options, or support only one of these two options (for example, when only one of these two options is supported in specification(s)).

The following description applies for the embodiment shown by reporting scheme 500. The reporting instances for wideband CQI/PMI are subframes satisfying $$(10 \times n_f + \lfloor n_s/2 \rfloor - N_{OFFSET,CQI}) \bmod (N_{pd}) = 0 \quad \text{(Equation 13)}$$

Here $n_f$, $n_s$, $N_{OFFSET,CQI}$, and $N_{pd}$ are frame index/number, slot index/number, subframe offset for CQI/PMI reporting (in subframes), and periodicity/reporting interval (in subframes) for CQI/PMI reporting. When two PMI values ($i_1$, $i_2$) are applicable, PMI reporting consists of both $i_1$ and $i_2$.

Regardless whether RI reporting is configured or not, when BI reporting configured, the reporting interval of the BI reporting is a multiple of that for CQI. Then the reporting instances for BI are subframes satisfying:

$$(10 \times n_f + \lfloor n_s/2 \rfloor - N_{OFFSET,CQI} - N_{OFFSET,BI}) \bmod (N_{pd} \times M_{BI}) = 0 \quad \text{(Equation 14)}$$

In another example, the reporting interval of the BI reporting can be configured as a multiple of that for CQI while the subframe offset for BI reporting is always set as 0 relative to that for CQI reporting. Then the reporting instances for BI are subframes satisfying:

$$(10 \times n_f + \lfloor n_s/2 \rfloor - N_{OFFSET,CQI}) \bmod (N_{pd} \times M_{BI}) = 0 \quad \text{(Equation 15)}$$

The description in equation 15 implies that once every $M_{BI}$ subframes containing CQI reports, BI is also reported. For those subframes, at least two possibilities apply. First, CQI report is dropped to allow BI, which is assigned a higher priority, to be reported alone in those subframes. For instance, when $M_{BI}=2$, CQI and BI are reported in turn (one after the other). Second, CQI and BI are reported jointly in those subframes.

The following description applies for the embodiment shown by reporting scheme 510. The description in equation 13 is applicable for wideband CQI and PMI2 (the second PMI $i_2$) which are always reported together. The description in equation 14 is applicable for BI reporting.

The following description applies for the embodiment shown by reporting scheme 520. The description in equation 13 is applicable for wideband CQI, PMI (when applicable, including both the first PMI $i_1$ and the second PMI $i_2$), and RI which are reported together so that RI reporting is configured. If RI reporting is not configured, only wideband CQI and PMI (when applicable, including both the first PMI $i_1$ and the second PMI $i_2$) are reported. The description in equation 14 is applicable for BI reporting.

Since BI reporting is defined relative to CQI reporting, descriptions pertaining to reporting schemes 550 and 560 overlap with those for reporting schemes 500, 510, and/or 520.

For example, when BI reporting is defined relative to CQI reporting, a priority rule needs to be defined in case of collisions between BI and RI (as well as other CSI parameter(s) reported together with RI apart from CQI, such as the first PMI $i_1$). For example, three possible solutions exist. First, RI reporting (along other CSI parameter(s) reported together with RI apart from CQI, such as the first PMI $i_1$) is dropped and the most recent value of RI should be assumed by the UE (as well as eNB) for CSI calculation. This assumes that BI is of a higher priority than RI. Second, BI reporting is dropped and the most recent value of BI should be assumed by the UE (as well as eNB) for CSI calculation. Third, both BI and RI (as well as other CSI parameter(s) reported together with RI apart from CQI, such as the first PMI $i_1$) are jointly reported in that subframe.

Just as CQI and RI, so the reporting configuration for BI is configured via higher-layer (RRC) signaling analogous to the description in Section 7.2.2 of REF3. TABLE 6 describes an exemplary mapping between the configuration index for BI reporting $I_{BI}$ to $M_{BI}$ and $N_{OFFSET,BI}$.

When RI reporting is configured, an additional restriction for BI reporting configuration can be imposed. For example, the configured value of $M_{BI}$ can only be equal or greater than that of $M_{RI}$.

TABLE 6

Mapping of $I_{BI}$ to $M_{BI}$ and $N_{OFFSET,BI}$ - defined relative to CQI reporting, several examples

| $I_{BI}$ | Value of $M_{BI}$ | Value of $N_{OFFSET,BI}$ |
|---|---|---|
| (A) | | |
| $0 \leq I_{BI} \leq 160$ | 1 | $-I_{BI}$ |
| $161 \leq I_{BI} \leq 321$ | 2 | $-(I_{BI} - 161)$ |

TABLE 6-continued

Mapping of $I_{BI}$ to $M_{BI}$ and $N_{OFFSET,BI}$ - defined relative to CQI reporting, several examples

| $I_{BI}$ | Value of $M_{BI}$ | Value of $N_{OFFSET,BI}$ |
|---|---|---|
| $322 \leq I_{BI} \leq 482$ | 4 | $-(I_{BI} - 322)$ |
| $483 \leq I_{BI} \leq 643$ | 8 | $-(I_{BI} - 483)$ |
| $644 \leq I_{BI} \leq 1023$ | | Reserved |
| (B) | | |
| $0 \leq I_{BI} \leq 160$ | 1 | $-I_{BI}$ |
| $161 \leq I_{BI} \leq 321$ | 2 | $-(I_{BI} - 161)$ |
| $322 \leq I_{BI} \leq 482$ | 4 | $-(I_{BI} - 322)$ |
| $483 \leq I_{BI} \leq 643$ | 8 | $-(I_{BI} - 483)$ |
| $644 \leq I_{BI} \leq 804$ | 16 | $-(I_{BI} - 644)$ |
| $805 \leq I_{BI} \leq 1023$ | | Reserved |
| (C) | | |
| $0 \leq I_{BI} \leq 160$ | 1 | $-I_{BI}$ |
| $161 \leq I_{BI} \leq 321$ | 2 | $-(I_{BI} - 161)$ |
| $322 \leq I_{BI} \leq 482$ | 4 | $-(I_{BI} - 322)$ |
| $483 \leq I_{BI} \leq 643$ | 8 | $-(I_{BI} - 483)$ |
| $644 \leq I_{BI} \leq 804$ | 16 | $-(I_{BI} - 644)$ |
| $805 \leq I_{BI} \leq 965$ | 32 | $-(I_{BI} - 805)$ |
| $966 \leq I_{BI} \leq 1023$ | | Reserved |
| (D) | | |
| $0 \leq I_{BI} \leq 160$ | 2 | $-I_{BI}$ |
| $161 \leq I_{BI} \leq 321$ | 4 | $-(I_{BI} - 161)$ |
| $322 \leq I_{BI} \leq 482$ | 8 | $-(I_{BI} - 322)$ |
| $483 \leq I_{BI} \leq 643$ | 16 | $-(I_{BI} - 483)$ |
| $644 \leq I_{BI} \leq 804$ | 32 | $-(I_{BI} - 644)$ |
| $805 \leq I_{BI} \leq 1023$ | | Reserved |
| (E) | | |
| $0 \leq I_{BI} \leq 160$ | 4 | $-I_{BI}$ |
| $161 \leq I_{BI} \leq 321$ | 8 | $-(I_{BI} - 161)$ |
| $322 \leq I_{BI} \leq 482$ | 16 | $-(I_{BI} - 322)$ |
| $483 \leq I_{BI} \leq 643$ | 32 | $-(I_{BI} - 483)$ |
| $644 \leq I_{BI} \leq 1023$ | | Reserved |
| (F) | | |
| $0 \leq I_{BI} \leq 160$ | 4 | $-I_{BI}$ |
| $161 \leq I_{BI} \leq 321$ | 8 | $-(I_{BI} - 161)$ |
| $322 \leq I_{BI} \leq 482$ | 16 | $-(I_{BI} - 322)$ |
| $483 \leq I_{BI} \leq 511$ | | Reserved |

In all the above descriptions and equations, if the term CRI (CSI-RS resource indicator) is used instead of BI (beam indicator), all designations with BI are replaced with CRI. For example: $I_{BI}$, $M_{BI}$, and $N_{OFFSET,BI}$ are replaced with $I_{CRI}$, $M_{CRI}$, and $N_{OFFSET,CRI}$, respectively.

Other than the above two configuration embodiments, another embodiment comprises a scheme where: 1) when a UE is configured with RI reporting, the reporting interval of the BI reporting is a multiple of that for RI but BI is reported in the same subframes/instances as RI; 2) when a UE is not configured with RI reporting (for instance, when CQI is calculated conditioned upon transmission rank of one, or when the number of antenna ports in each configured CSI-RS resource is one, or when RI reporting is turned off), the reporting interval of the BI reporting is a multiple of that for CQI/PMI and BI reporting is assigned the BI reporting's own subframe offset. Then the reporting instances for CQI/PMI, RI, and BI are subframes satisfying:

$$(10 \times n_f + \lfloor n_s/2 \rfloor - N_{OFFSET,CQI} - N_{OFFSET,RI} - N_{OFFSET,BI}) \bmod (N_{pd} \times M_{RI} \times M_{BI}) = 0 \quad \text{(Equation 15)}$$

The same equation is used for both scenarios. For example, equation 15 is further constrained as follows. When a UE is configured with RI reporting, $N_{OFFSET,BI}$ is set to 0. A table similar or analogous to TABLE 4 can be used. When a UE is not configured with RI reporting, $N_{OFFSET,RI}$ is set to 0 and $M_{RI}$ is set to 1. A table similar or analogous to TABLE 6 can be used.

Another embodiment comprises a scheme where: 1) when a UE is configured with RI reporting, the reporting interval of the BI reporting is a multiple of that for RI but BI can be reported with a non-zero subframe offset relative to RI; 2) when a UE is not configured with RI reporting (for instance, when CQI is calculated conditioned upon transmission rank of one, or when the number of antenna ports in each configured CSI-RS resource is one, or when RI reporting is turned off), the reporting interval of the BI reporting is a multiple of that for CQI/PMI and BI reporting is assigned the BI reporting's own subframe offset. Then the reporting instances for CQI/PMI, RI, and BI are subframes satisfying:

$$(10 \times n_f + \lfloor n_s/2 \rfloor - N_{OFFSET,CQI} - N_{OFFSET,RI} - N_{OFFSET,BI}) \mod(N_{pd} \times M_{RI} \times M_{BI}) = 0 \quad \text{(Equation 16)}$$

In yet another embodiment, the same equation is used for both scenarios. For example, equation 15 is further constrained as follows. When a UE is configured with RI reporting, equation 16 is used. A table similar or analogous to TABLE 7.2.2-1B in REF3 can be used. When a UE is not configured with RI reporting, $N_{OFFSET,RI}$ is set to 0 and $M_{RI}$ is set to 1. A table similar or analogous to TABLE 6 can be used.

In all the above descriptions and equations, if the term CRI (CSI-RS resource indicator) is used instead of BI (beam indicator), all designations with BI are replaced with CRI. For example: $I_{BI}$, $M_{BI}$, and $N_{OFFSET,BI}$ are replaced with $I_{CRI}$, $M_{CRI}$, and $N_{OFFSET,CRI}$, respectively.

The following embodiments relate generally to downlink synchronization for narrow band communication systems.

Machine-type communications (MTC) through cellular networks is emerging as a significant opportunity for new applications in a networked world where devices communicate with humans and with each other. Compared to typical human communication, MTC typically has relaxed latency and Quality of Service (QoS) requirements and often does not require mobility support. MTC can be used for a wide variety of applications in different sectors including healthcare, such as monitors, industrial, such as safety and security, energy, such as meters and turbines, transport, such as fleet management and tolls, and consumer and home, such as appliances and power systems.

An important requirement for commercial success of MTC is for respective UEs to have low power consumption and a significantly lower cost than conventional UEs serving human communications. Cost reduction for low cost UEs (LC-UEs) relative to conventional UEs can be achieved, among other simplifications, by constraining a transmission BW and a reception BW to a small value, such as 6 RBs, of an UL system BW or a DL system BW, respectively, by reducing a size of a data TB a LC-UI: transmit or receive, or by implementing one receiver antenna instead of the two receiver antennas that are implemented for conventional UEs.

LC-UEs can be installed in basements of residential buildings or, generally, in locations where a LC-UE experiences a large path-loss loss and poor coverage due to a low Signal to Noise and Interference Ratio (SINR). LC-UE design selections of one receiver antenna and reduced maximum power amplifier gain can also result to coverage loss even when a LC-UE does not experience a large path-loss. Due to such reasons, a LC-UE can require operation with enhanced coverage. In extreme poor coverage scenarios, LC-UEs may have characteristics such as very low data rate, greater delay tolerance, and limited mobility, thereby potentially being capable to operate without some messages/channels. Not all LC-UEs require Coverage Enhancement (CE) or require a same amount of CE. In addition, in different deployment scenarios, a required CE level can be different for different NodeBs, for example depending on a NodeB transmission power or an associated cell size or number of receiver antennas, as well as for different LC-UEs, for example depending on a location of a LC-UE.

A conventional way to support CE is to repeat transmissions of channels either in a time domain or in a frequency domain. A LC-UE operating with CE can be configured by a serving NodeB with a CE level corresponding to a number of subframes for a transmission or reception of a respective channel. For example, a LC-UE can be configured by a serving NodeB a first number of subframes to receive repetitions of a PDSCH, a second number of subframes to transmit repetitions of a PUSCH, and so on. A DL control channel for a UE operating with CE is assumed to be based on the EPDCCH structure and will be referred to as M-PDCCH. In order to minimize the number of subframes that a LC-UE needs to receive a PDSCH or an M-PDCCH, respective transmissions can be over all RBs where the LC-UE can receive in a subframe, such as in a sub-band of 6 contiguous RBs, as the NodeB is assumed to not be power limited. Conversely, as a LC-UE configured to transmit an UL channel with repetitions already transmits with a maximum power, in order to maximize the power spectral density, the LC-UE can transmit in 1 RB in a subframe.

Transmissions of physical channels with repetitions consume additional resources and result to lower spectral efficiency and larger LC-UE power consumption. It is therefore beneficial to enable mechanisms that provide improved reception reliability. For numerous types of LC-UE which are largely static, reliable CSI reporting can be made available at the NodeB with considerably lower update rate. The availability of reliable CSI at the Node B from a particular LC-UE facilitates a more focused DL transmission (for both PDSCH and M-PDCCH) to the LC-UE. For example, the NodeB may choose one out of a plurality of sub-bands configured for the LC-UE if reliable sub-band CSI is available. Not only does it result in better performance, but it also simplifies resource allocation as LC-UEs typically co-exist with typical UEs within a cell.

In addition to MTC, a narrowband LTE system is also of relevance where only one PRB is utilized for transmission. In such a narrowband system, an elongated transmission time interval (TTI) which spans a few 1 ms subframes is required if inter-sub-carrier spacing is kept the same (15 kHz). One particular challenge is to design synchronization signals which enable reasonably fast synchronization (including neighboring cell search) even with 1-PRB limitation.

Therefore, there is a need to design synchronization signals for narrowband (1-PRB) LTE scenarios which maintain some level of compatibility with legacy LTE synchronization signals as well as a typical LTE synchronization procedure.

The present disclosure relates to enabling LTE synchronization and cell search for narrowband LTE systems wherein a serving eNB transmits signals to a UE within 1 PRB. For initial synchronization, the UE attempts to detect the presence of this eNB through attaining coarse time and frequency synchronization along with detecting cell identification (cell ID) associated with the eNB. For neighboring cell search, the UE attempts to identify at least one candidate eNB to which the UE can establish RRC connection. In synchronous networks, this pertains primarily to detecting one or more cell IDs associated with a set of candidate eNBs.

In the following, for brevity, FDD is considered as the duplex method for both DL and UL signaling but the embodiments of the present disclosure are also directly applicable to TDD. Additionally, although the following embodiments are described with reference to UEs (herein termed ultra-low-cost UEs or ULC-UEs) which can only receive narrowband transmissions, the following embodiments can also apply for conventional UEs that are assigned with reduced rate transmissions.

The following embodiments relate to DL synchronization procedure for ULC-UE.

Figure 6A:
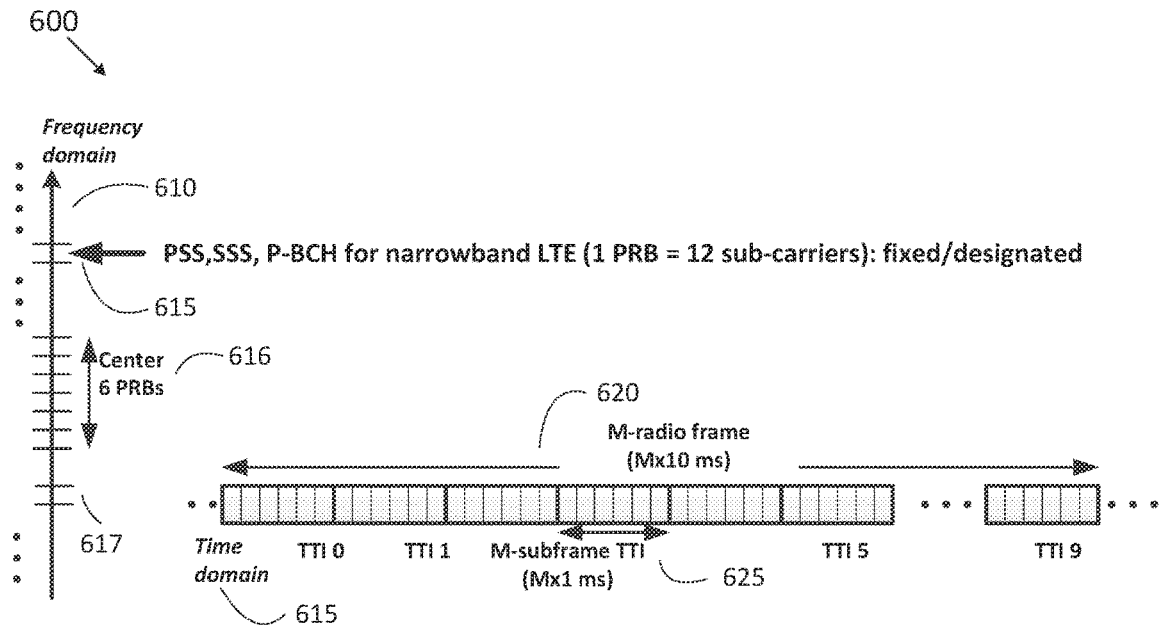
FIG. 6A illustrates an example signal transmission for a narrowband LTE system in terms of time-domain and frequency-domain locations according to various embodiments of the present disclosure.

Example signal transmission scheme 600 of FIG. 6A describes signal transmission for a narrowband LTE system in terms of time-domain (610) and frequency-domain (615) locations. In LTE, pertinent signals for DL synchronization are the primary synchronization signal (PSS), the secondary synchronization signal (SSS), and the primary broadcast channel (P-BCH). To avoid negative impact on legacy UEs, these signals, along with other signals pertinent to narrowband LTE, are transmitted outside the center 6 PRBs (616). Therefore, one PRB (for example, frequency-domain locations 615, which consists of 12 sub-carriers assuming the same inter-sub-carrier spacing of 15 kHz) outside the center 6 PRBs is allocated for transmitting narrowband LTE signals pertinent to DL synchronization (in contrast to a PRB denoted as 617 which does not carry synchronization signals). The location of this 1-PRB allocation is predetermined (fixed) and specified. For instance, the index of the designated PRB within the DL system bandwidth, measured relative to the center 6 PRBs, is predetermined and specified.

Since only 1 PRB is available for narrowband LTE, longer transmission time interval (TTI) and radio frame are needed. This can be achieved by increasing the TTI length and radio frame length by a factor of M while maintaining the length of an OFDM symbol. This results in an M-sub-frame TTI (625) and 10M ms radio frame (620). An exemplary value of M is 6 which allows a narrowband LTE system to have a similar capacity or coverage to MTC (which utilizes the center 6 PRBs).

The designated 1-PRB 615 also carries other signals and channels such as PDSCH, PDCCH, and reference signals. This, however, does not preclude a serving eNB from utilizing other 1-PRB allocations for narrowband LTE which do not contain PSS, SSS, and P-BCH. This allows the eNB to serve a large number of ULC-UEs where such ULC-UEs are grouped and each group is allocated one 1-PRB allocation. For example, the eNB can signal a 1-PRB allocation indication in a dedicated channel to each UE after initial DL synchronization procedure is completed. For example, this signal can be an index of the allocated 1-PRB within the DL system bandwidth, measured relative to the center 6 PRBs or the designated 1-PRB 615. This index is encoded as a part of RRC configuration (ASN.1 parameter) for narrowband LTE operations.

Figure 6B:
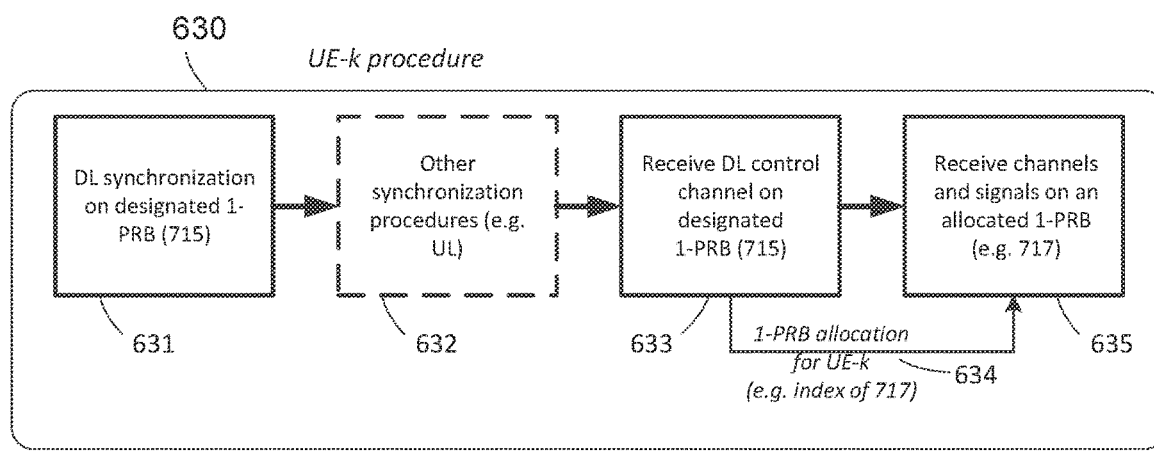
FIG. 6B illustrates an example of a signal reception procedure for ULC-CE according to various embodiments of the present disclosure.

An illustrative embodiment of this procedure 630 is illustrated in FIG. 6B. After the UE successfully completes the initial DL synchronization procedure 631 (along with UL synchronization 632) and is able to demodulate DL control signaling such as PDCCH (633) in the designated 1-PRB 615, it decodes a signal 634 from the eNB containing another 1-PRB allocation to the UE. This signaling can be performed semi-statically via higher-layer (RRC) within the designated 1-PRB 615. After the UE successfully detects this 1-PRB allocation, the UE assumes that the UE's PDSCH reception in the allocated 1-PRB which can be the same as or different (for example, 617) from 615. Thus the UE receives signals and channels on this allocated 1-PRB (635) until the next higher-layer (RRC) reconfiguration message which configures the UE with a different 1-PRB allocation.

Therefore, the designated 1-PRB 615 serves as the initial PRB wherein a ULC-UE performs DL initial synchronization. In a same manner, this designated 1-PRB can be used as a default PRB for narrowband LTE wherein the ULC-UE performs neighboring cell search. For example, in an event which triggers the UE to perform neighboring cell search, the ULC-UE can switch from the UE's allocated 1-PRB to the designated 1-PRB 615.

Figure 6C:
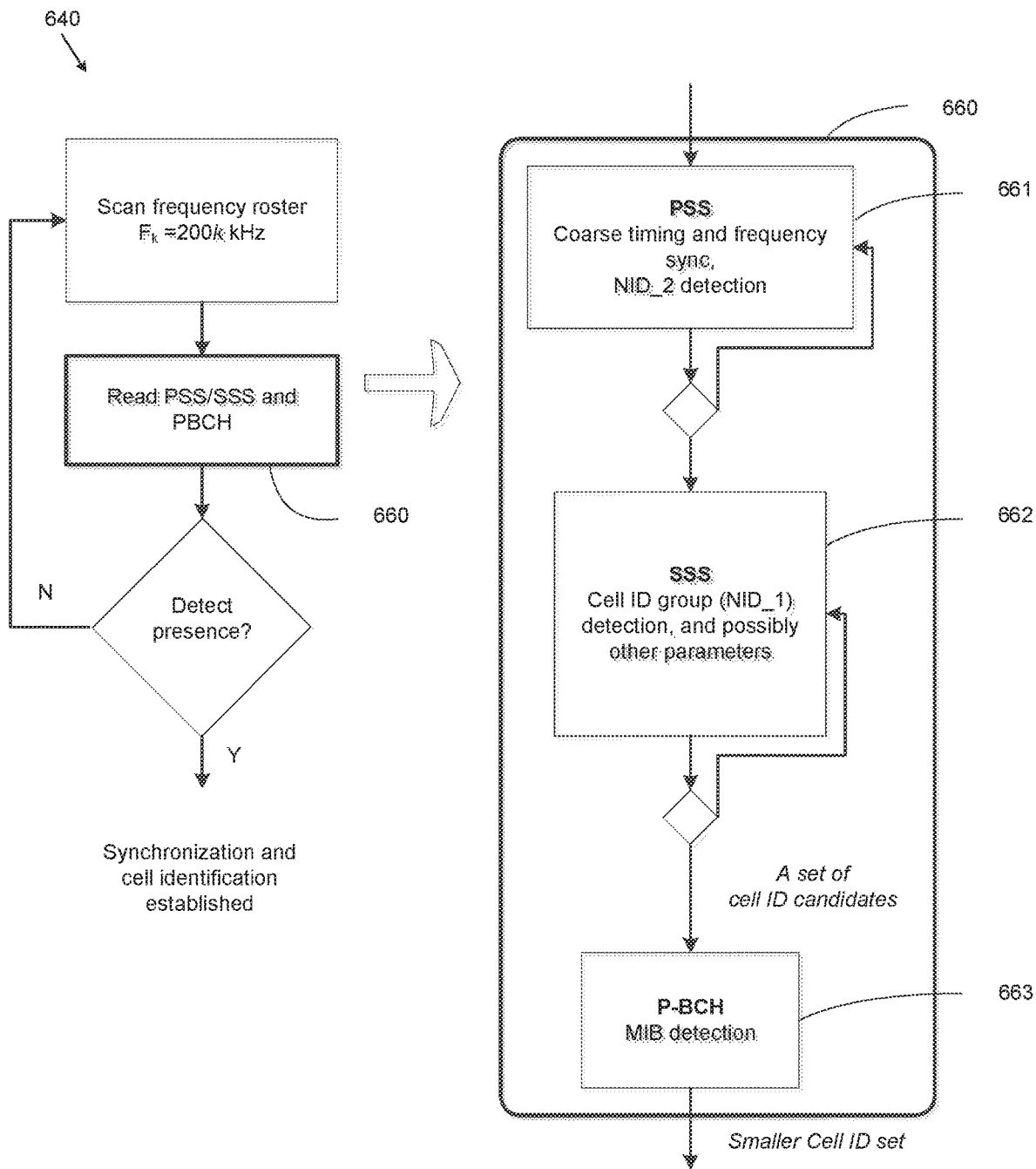
FIG. 6C illustrates an example UE procedure for downlink synchronization according to various embodiments of the present disclosure.

FIG. 6C illustrates an exemplary UE procedure 640 for DL synchronization. The procedure 640 embodies an initial DL synchronization where a UE is searching for a frequency allocation within a frequency roster associated with a particular carrier frequency. For UMTS and LTE systems, the roster is a grid of discrete equally-spaced (200 kHz) frequency values. For each of the frequency values, the UE detects PSS and SSS together with P-BCH (660). When such a presence is detected, cell synchronization or identification is attained. Then the UE proceeds with other procedures such as UL synchronization (utilizing P-RACH) and detecting the presence of DL control signaling.

In addition to providing cell ID group information, PSS detection 661 facilitates coarse (initial) timing and frequency synchronization. For example, the UE can perform matched filtering (cross correlation) between a received signal and a copy of the PSS for each viable combination of cell ID group and frequency offset value. Then at least one combination of coarse timing estimate, coarse frequency-offset estimate, and cell ID group estimate is detected. Once this first stage is completed, coarse timing and frequency offset compensation is performed, followed by a second stage 662 where the UE detects a complete cell ID from a hypothesized location of the SSS within the received signal (inferred from the coarse timing estimate). In addition to detecting a complete cell ID, SSS can also carry other cell-specific parameters such as frame timing information whenever applicable. The length of the cyclic prefix (CP) can also be detected blindly from SSS. A set of cell ID candidates is obtained and further reduced in P-BCH detection 663.

The following embodiments relate to time locations for PSS and SSS.

PSS, SSS, and P-BCH can be placed in different locations within each M-radio-frame. Four embodiments are described in TABLE 7 for PSS and SSS.

TABLE 7

Four embodiments - time-domain location of PSS and SSS

| Embodiment | Number of PSS/SSS per M-radio-frame | Relative position of PSS to SSS | Potential feature(s) for ULC-UE synchronization |
|---|---|---|---|
| 1A | 1 | Adjacent | Allow coherent detection for SSS; no need for frame timing in SSS |
| 1B | 1 | Non-adjacent | Non-coherent detection for SSS; no need for frame timing in SSS; no need for blind CP length detection |
| 2A | 2 | Adjacent | Allow coherent detection for SSS; |
| 2B | 2 | Non-adjacent | Non-coherent detection for SSS; no need for blind CP length detection |

First, a maximum of two PSS-SSS pairs can be transmitted to minimize DL overhead. When only 1 PSS-SSS pair is transmitted per M-radio-frame, this pair can be transmitted in TTI 0. When two PSS-SSS pairs are transmitted per M-radio-frame, two PSS-SSS pairs can be transmitted in TTI-0 and TTI-5. In this second example, a frame timing indicator (where a first hypothesis indicates a first half of an M-radio-frame and a second hypothesis a second half of an M-radio-frame) is needed just as in Rel.12 LTE. While the second example results in more overhead, it at least facilitates faster timing and frequency acquisition since PSS is transmitted twice as often as the first example. At best, it allows faster DL synchronization since cell ID can be detected twice faster. It comes at the expense of UE complexity due to the doubling of the number of SSS-related hypotheses. However, this increase in complexity can be justified since the radio-frame unit is increased by a factor of M (only transmitting one PSS-SSS pair per 10M ms is perhaps insufficient).

Second, PSS and SSS can either be placed adjacent to each other or not.

When PSS and SSS are adjacent within one subframe or M-subframe or M-slot (which is half of an M-subframe), PSS can be used by a UE to estimate DL channel coefficients thereby enabling coherent detection of SSS. The benefit of this approach, however, is questionable since the residual frequency offset is large enough to cause a significant impairment on channel estimation even when PSS is placed next to SSS. In addition, the increase in UE complexity due to channel estimation and coherent detection can be significant for ULC-UEs. If only one OFDM symbol is used for PSS and SSS, placing SSS adjacent to PSS requires the UE to know the CP length before it can decode SSS. In Rel.12 LTE, this is typically attained by blindly detecting the CP length during SSS detection/demodulation (that is, the total number of hypotheses is increased by a factor of two).

In another example, if PSS and SSS can be separated in time domain (e.g. coherent SSS detection is not of a concern), PSS and SSS can be placed at two different subframes or M-subframes or M-slots. For example, both PSS and SSS can be placed at the end of subframes or M-subframes or M-slots. If only one OFDM symbol is used for PSS and SSS, this requirement circumvents the need for the UE to blindly detect the CP length during the process of SSS detection. For example, the CP length is detected during or after P-BCH detection. This can be done either via blind detection or including the CP length information in the master information block (MIB).

If multiple OFDM symbols are used for PSS and/or SSS, blind CP detection (performed as a part of SSS detection) is needed regardless whether PSS is placed next to SSS or not.

The following embodiments relate to PSS and SSS sequences.

PSS is used to facilitate coarse timing and frequency synchronization. PSS can also carry cell ID group information. Although timing resolution is limited by signal bandwidth (for example, 1 PRB=180 kHz), the length of a PSS sequence is important to ensure low sidelobes in the PSS sequence's auto-correlation profile. To attain a similar auto-correlation profile, each PSS sequence is defined in terms of concatenating Npss OFDM symbols. For example, a natural design can be obtained when the sequence is designed in time domain where each sequence spans over Npss OFDM symbols. If M is chosen to be 6, Npss can be chosen to be representative of one LTE slot (=0.5 ms). This is equivalent to 7 OFDM symbols for normal CP or 6 OFDM symbols for extended CP.

SSS is used to convey at least cell ID information. If cell ID group information is signaled by PSS (per Rel.12 LTE), only the remaining part of cell ID information is needed in SSS. TABLE 2 describes four possibilities assuming the same number of total number of cell ID hypotheses as Rel.12 LTE (=168×3=504). As shown in TABLE 8, the total number of SSS hypotheses depends on the number of PSS-SSS pairs per M-radio-frame hypotheses and whether PSS carries cell ID group information.

TABLE 8

Four possibilities of the number of hypotheses in SSS

| Possibility | PSS carrying cell ID group (3 hypotheses)? | No. PSS-SSS per M-radio-frame | Number of SSS hypotheses Ksss |
|---|---|---|---|
| 1 | Yes | 1 | 168 |
| 2 | Yes | 2 | 2 (frame timing hypotheses) × 168 = 336 |
| 3 | No | 1 | 504 |
| 4 | No | 2 | 2 (frame timing hypotheses) × 504 = 1008 |

Once a UE acquires a coarse timing, it is able to decode information that is encoded in frequency domain. Since there are only 12 sub-carriers per OFDM symbol, multiple OFDM symbols are required to encode the number of hypotheses shown in TABLE 8. Thus, SSS is encoded over $N_{SSS}$ OFDM symbols. In this embodiment of the present disclosure, the total number of SSS hypotheses $K_{SSS}$ is partitioned across $N_{SSS}$ OFDM symbols where each group of $\lfloor K_{SSS}^{1/N_{SSS}} \rfloor$ hypotheses is encoded in frequency domain within each of the $N_{SSS}$ OFDM symbols.

Figure 7A:
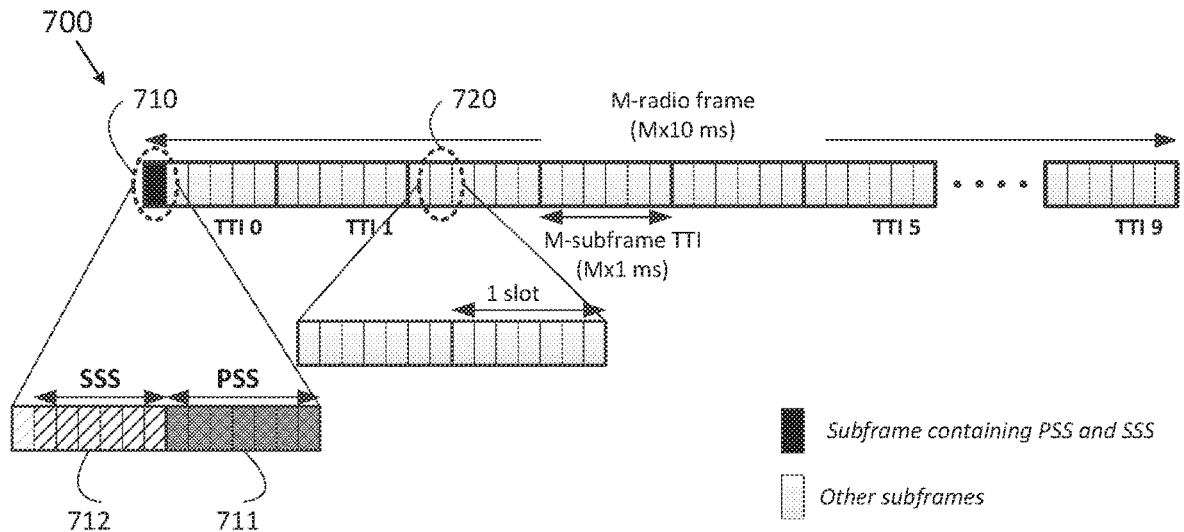
FIG. 7A illustrates an example of primary synchronization signal (PSS) and secondary synchronization signal (SSS) as situated within an M-sub-frame TTI and an M-radio-frame according to various embodiments of the present disclosure.

FIG. 7A illustrates an example of PSS and SSS within an M-sub-frame TTI and an M-radio-frame. In subframe structure 700, SSS is placed before PSS in the first subframe of TTI-0 (the first TTI). For illustrative purposes, M is chosen to be 6. Within the first subframe 710, PSS occupies the entire second slot 711 (0.5 ms) while SSS occupies $N_{SSS}=6$ OFDM symbols in the first slot 712. In this illustrative embodiment, only one PSS-SSS pair is transmitted in one M-radio-frame and time-multiplexed with other subframes (step 720). This represents embodiment 1A in TABLE 7. For example, SSS carries either 168 or 504 hypotheses, depending on whether PSS carries cell ID group information.

Figure 7B:
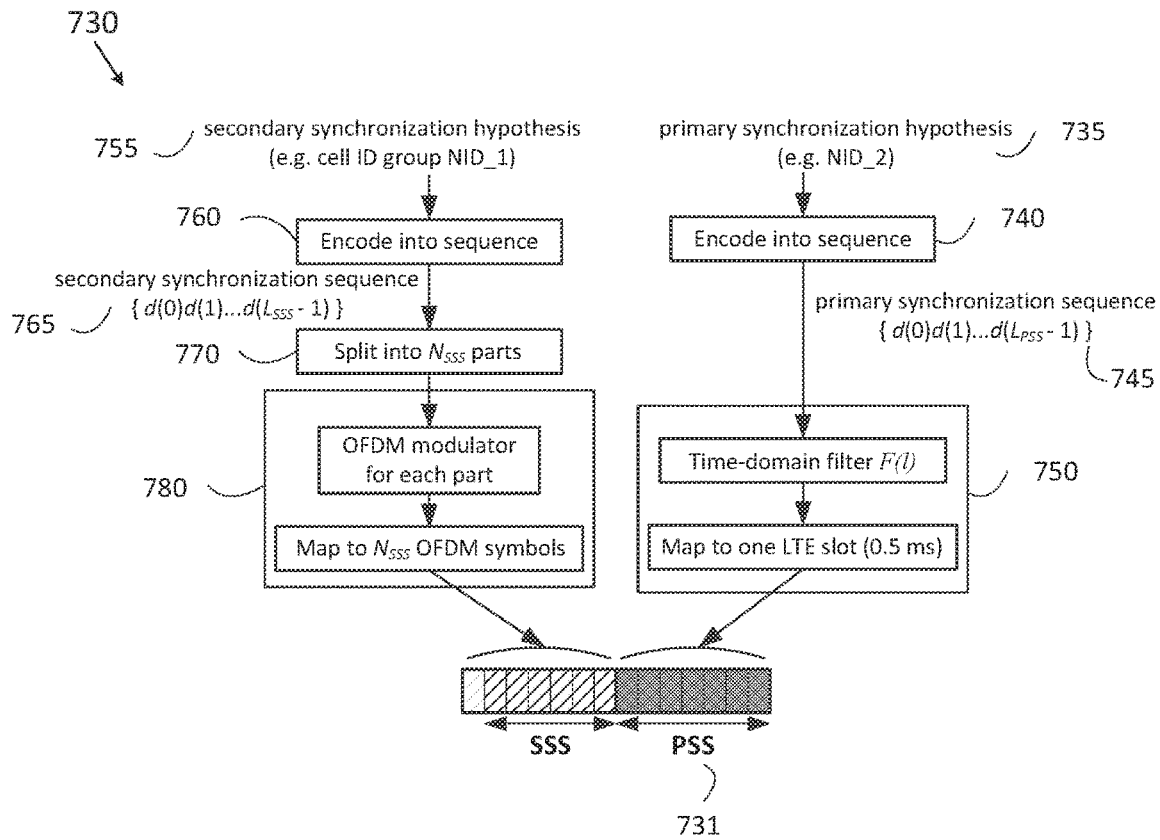
FIG. 7B illustrates an example of PSS and SSS generation according to various embodiments of the present disclosure.

FIG. 7B describes an example, of PSS and SSS generation procedure 730 according to various embodiments. If PSS is used to encode a cell-specific parameter such as cell ID group in Rel.12 LTE, a corresponding value or hypothesis 735 is encoded into a time-domain primary synchronization sequence 745 of length-$L_{PSS}$. An example of this encoding process (740) for Rel.12 LTE is given in section 6.11.1.1 of REF1 where three values of NID_2 are associated with three different frequency-domain Zadoff-Chu sequences. This allows different cells (such as neighboring cells) to be assigned different physical layer ID NID_2 (since NID_cell=3·NID_1+NID_2). In another example, PSS can be associated with a single time-domain sequence and does not carry any cell-specific parameter. In this example, 735 and 740 do not apply.

The primary synchronization sequence 745 is then mapped to one LTE slot 731. The mapping process 750 can include processing the time-domain sequence 745 with a time-domain filter. That is, the sequence 745 is not mapped to frequency sub-carriers followed by a DFT operation (typical to OFDM/OFDMA transmission). Instead, a time-domain sequence is mapped to all the available time-domain samples in slot 731.

As an example, the Zadoff-Chu (ZC) sequence family of length-83 (prime number is preferred) defined in time-domain can be utilized for primary synchronization sequence. ZC family is characterized with good auto- and cross-correlation properties:

$$d_u(n) = e^{-j\pi u \frac{n(n+1)}{83}}, n = 0, 1, \ldots, 82 \qquad \text{(Equation 16)}$$

If, analogous to Rel.12 LTE, three sequences are needed to represent NID_2=0, 1, and 2, three root sequence indices (three values of $u \in \{u_0, u_1, u_2\}$) can be used. To reduce ULC-UE complexity, two root indices can be chosen such that $u_1+u_2=83$. If only one sequence is needed, one root index value can be chosen so that a common primary synchronization sequence is used for all cells. This length-83 sequence is then filtered with a time-domain filter which matches the number of samples available within one 0.5-ms slot and shapes the frequency response of PSS.

For SSS, a corresponding value or hypothesis 755 is encoded into a time-domain secondary synchronization sequence 765 of length-$L_{SSS}$. An example of this encoding process (step 760) for Rel.12 LTE is given in section 6.11.1.2 of REF1 where 168 values of NID_1, together with 2 frame timing hypotheses, are associated with 336 frequency-domain M-sequence pairs. In the present disclosure, a length-$L_{SSS}$ secondary synchronization sequence is partitioned into $N_{SSS}$ parts (step 770) where each part is mapped on one OFDM symbol in frequency domain (step 780). In this illustrative embodiment, $N_{SSS}$ is set to be 6.

As an example, with possibility 1 in TABLE 8, 168 SSS hypotheses can be signaled with $N_{SSS}=4$ OFDM symbols where each OFDM symbol (consisting of 12 frequency sub-carriers) carries 4 hypotheses. This configuration offers a total of 256 available hypotheses from which a subset of $K_{SSS}=168$ hypotheses can be utilized. Partitioning the number of SSS hypotheses can be performed before or after sequence encoding.

Figure 8A:
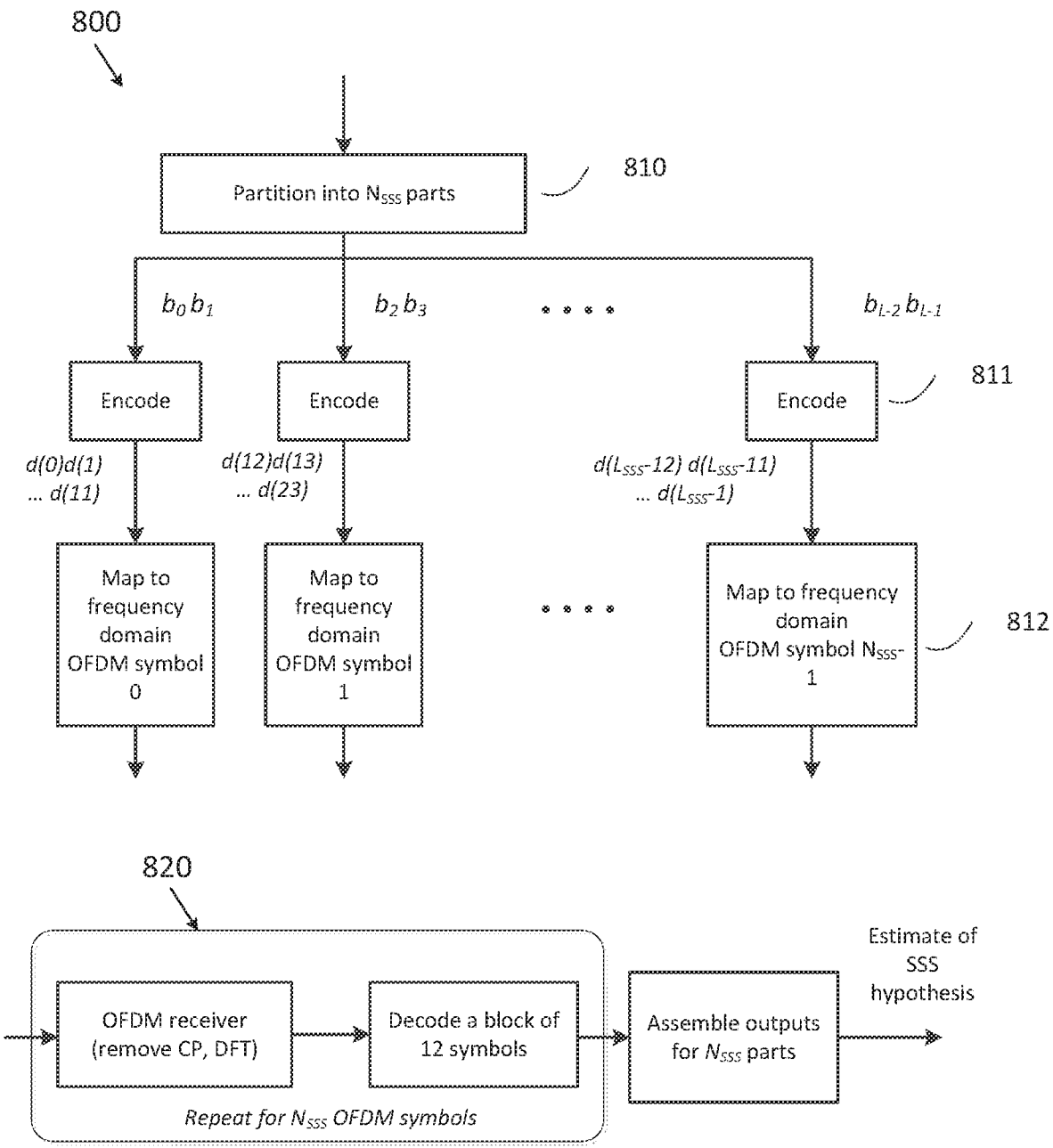
FIG. 8A illustrates example of SSS design wherein sequence partitioning is performed before decoding according to various embodiments of the present disclosure.

The first example (partitioning before encoding) is illustrated in FIG. 8. In process 800, a total of $K_{SSS}$ hypotheses (where $2^{L-1} \le K_{SSS} \le 2^L$) are partitioned into $N_{SSS}$ parts (step 810). In FIG. 8, this hypothesis partitioning is exemplified in partitioning a length-L binary sequence into L/2 length-2 sequences. Each of these parts is then encoded into a length-12 sequence $\{d(12p)d(12p+1) \ldots d(12p+11)\}$ (p=0, 1, ... ). Here, the encoder 811 is associated with a coding gain of 2/12=1/6. Then each of these segments is mapped in frequency-domain within a designated OFDM symbol (step 812).

For this first example, decoding process at a UE tends to be low in complexity since the length of each codeword in 811 is small. This complexity advantage comes at the expense of coding gain (such as minimum distance property). For encoder 811, any simple low-rate block coding can be used for this purpose including repetition coding or a block coding combined with repetition coding. In another example, low-cross-correlation sequences such as four length-11 Zadoff-Chu sequences or four length-8 Walsh-Hadamard sequences can be used when the total number of SSS hypotheses is 168. Yet another example which utilizes all the 12 sub-carriers per OFDM symbol is a concatenation of between four (out of eight) length-8 Walsh-Hadamard sequences and four length-4 Walsh-Hadamard sequences. This construction forms a set of four length-12 orthogonal sequences. An example is given in TABLE 9 below.

TABLE 9

SSS Segment Encoder based on Walsh-Hadamard sequences

| Hypothesis | Length-12 Sequence |
|---|---|
| 0 | +1 +1 +1 +1 −1 −1 −1 −1 +1 +1 +1 +1 |
| 1 | +1 −1 +1 −1 −1 +1 −1 +1 +1 −1 +1 −1 |
| 2 | +1 +1 −1 −1 −1 −1 +1 +1 +1 +1 −1 −1 |
| 3 | +1 −1 +1 −1 −1 +1 −1 +1 +1 −1 +1 −1 |

For this first example, an exemplary UE receiver algorithm is shown by process 820—described for each CP length hypothesis. After acquiring coarse timing and frequency synchronization, a UE locates a copy of SSS and applies OFDM demodulation on each of the $N_{SSS}$ OFDM symbols (CP removal and DFT). For each of these OFDM symbols, a decoder is applied to the 12-symbol segment. The outputs associated with $N_{SSS}$ segments are then assembled to produce an estimate of SSS hypothesis. This process is repeated for both CP length hypotheses.

Figure 8B:
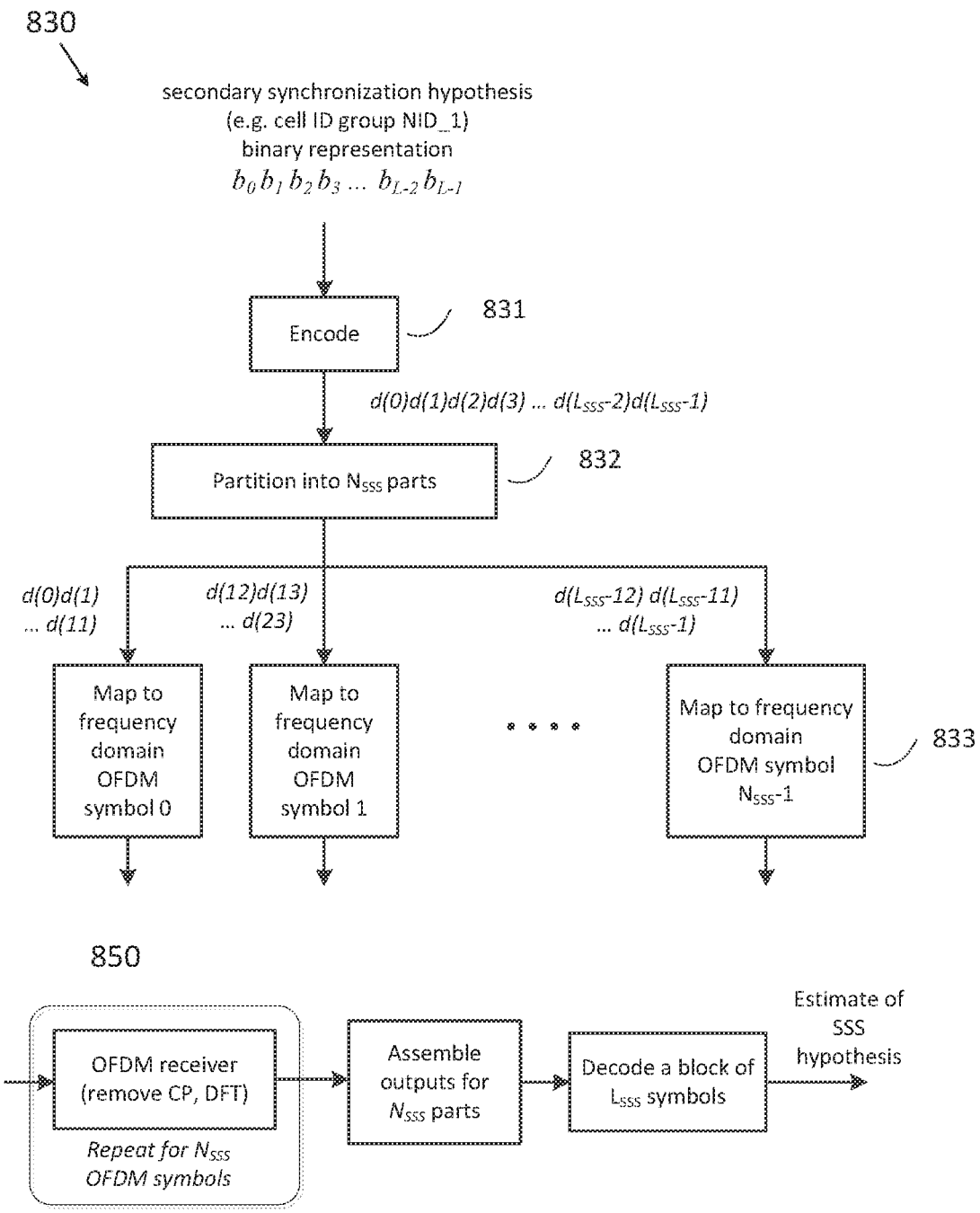
FIG. 8B illustrates example of SSS design wherein sequence partitioning is performed after decoding according to various embodiments of the present disclosure.

The second example (partitioning after encoding) is illustrated in FIG. 8B. In process 830, a total of $K_{SSS}$ hypotheses (where $2^{L-1} \le K_{SSS} \le 2^L$) are signaled in a length-L binary sequence. This sequence is further encoded into a sequence $\{d(0)d(1) \, d(L_{SSS}-1)\}$ (step 831) that is partitioned into $N_{SSS}$ parts (step 832). Then each of these segments is mapped in frequency-domain within a designated OFDM symbol (step 833).

For this second example, decoding process at a UE tends to be higher in complexity since the length of each codeword in step 832 is larger. But better coding gain is expected (such as minimum distance property). When the total number of SSS hypotheses is 168, a short block-length rate 1/3 convolutional code can be used for this purpose, perhaps in combination with 2× repetition.

For this second example, an exemplary UE receiver algorithm is described in embodiment 850—described for each CP length hypothesis. After acquiring coarse timing and frequency synchronization, a UE locates a copy of SSS and applies OFDM demodulation on each of the $N_{SSS}$ OFDM symbols (CP removal and DFT). The outputs associated with $N_{SSS}$ OFDM symbols are then assembled. A decoder is then applied to the concatenated $L_{SSS}$-symbol segment to produce an estimate of SSS hypothesis. This process is repeated for both CP length hypotheses.

Since the CP length is unknown before SSS decoding, blind CP length detection is done by testing both CP length hypotheses as a UE attempts to decode an SSS hypothesis. Since the total length of SSS(=$N_{SSS}$ times the length of one OFDM symbol with CP included) depends on the CP length, a wrong CP length hypothesis will result in poor SSS hypothesis detection. Therefore, the UE is expected to be able to decode the SSS hypothesis with a right CP length hypothesis.

Figure 9:
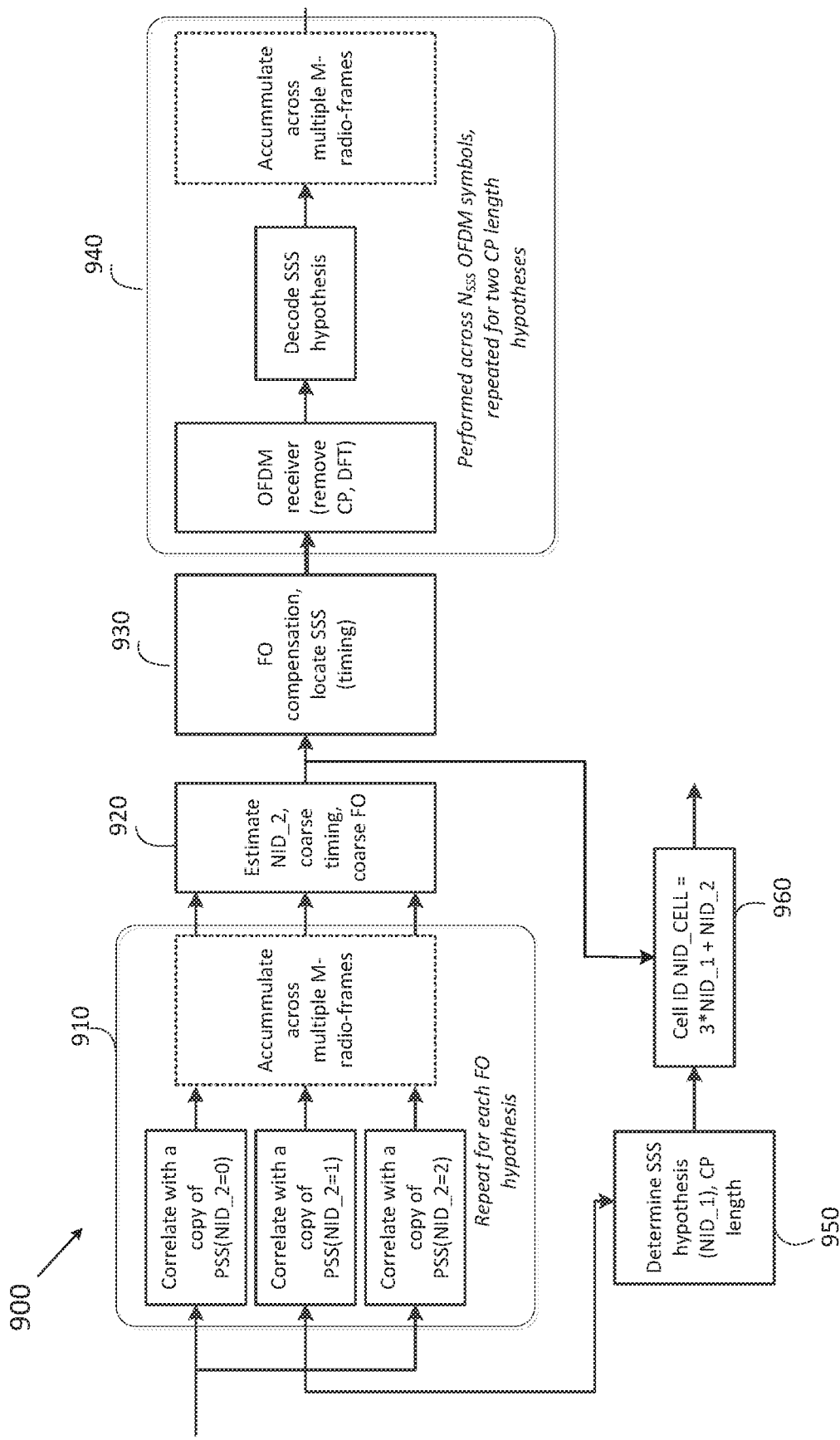
FIG. 9 illustrates an example UE algorithm for downlink synchronization wherein PSS and SSS are utilized to detect cell identification (cell ID) according to various embodiments of the present disclosure.

FIG. 9 describes an exemplary UE algorithm for attaining DL synchronization based on a PSS-SSS design which encodes 3 physical ID hypotheses in PSS and 168 cell ID group in SSS. For example, the process 900 may be performed by the UE 116. In this illustrative embodiment, only one PSS-SSS pair is transmitted in one M-radio-frame period. Process 900 includes at least a PSS correlator bank and an optional accumulator at step 910; an estimator at step 920 of NID_2 (physical ID), coarse timing, and coarse frequency offset; frequency offset compensator and timing correction (which allows SSS to be located) at step 930; an SSS demodulator and decoder at step 940; an estimator of SSS hypothesis and CP length at step 950; and a calculator of cell ID 960. In step 910, a set of discrete frequency offset values can be used which amounts to multiplying the total number of PSS hypotheses. In step 940, non-coherent demodulation can be used to decode SSS. For coherent demodulation, PSS can be used for channel estimation. The output of process 900 includes an estimation of cell ID, coarse timing (to enable OFDM demodulation), coarse frequency offset, and CP length.

Figure 10:
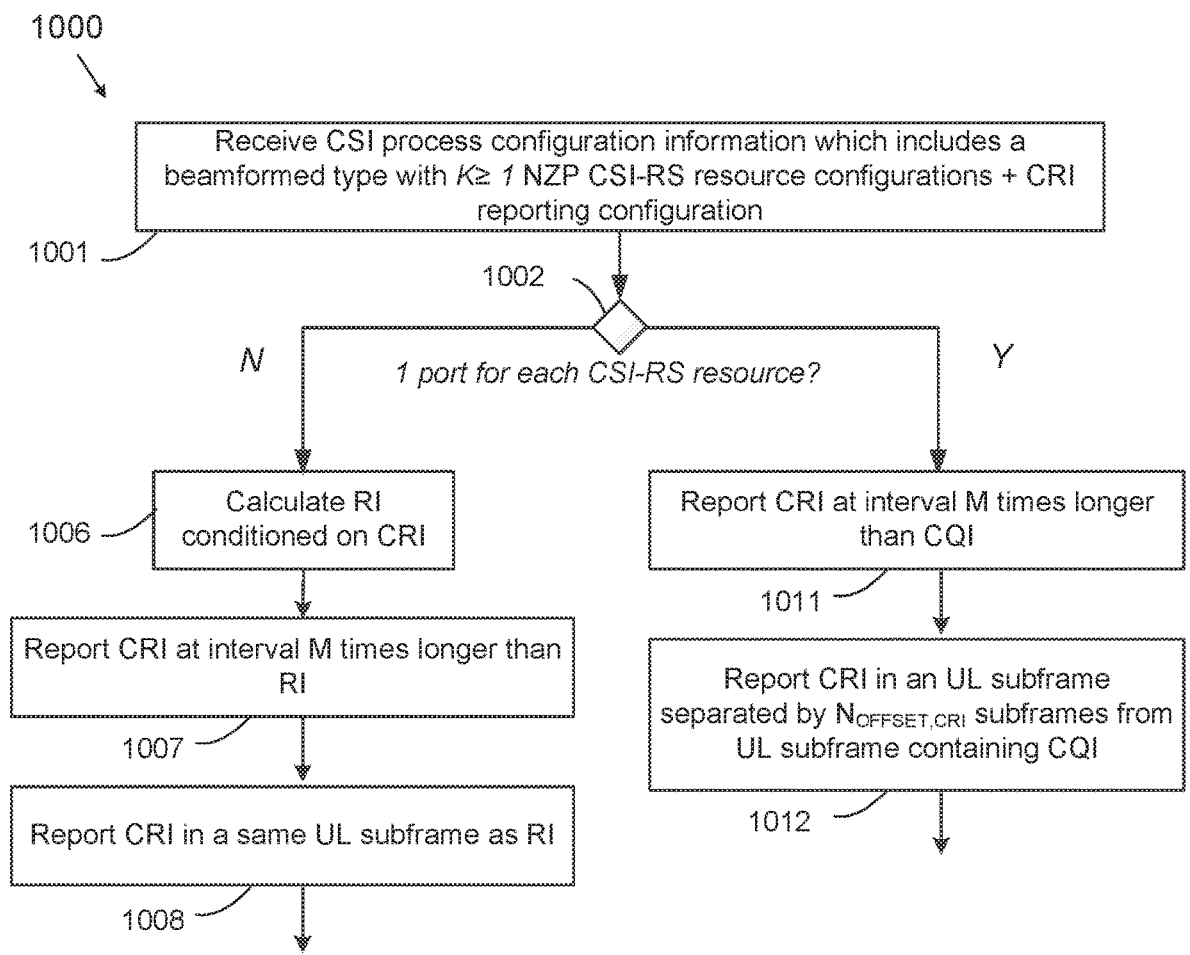
FIG. 10 illustrates an example method wherein a UE receives CSI process configuration information which includes at least one beamformed type with a plurality of NZP CSI-RS resource configurations according to various embodiments of the present disclosure.

FIG. 10 illustrates an example method 1000 wherein a UE receives CSI process configuration information which includes at least one beamformed type with a plurality of NZP CSI-RS resource configurations according to an embodiment of the present disclosure. For example, the method 1000 can be performed by the UE 116.

The method begins with the UE receiving CSI process configuration information which includes at least one 'beamformed'/CLASS B eMIMO-Type with K>1 NZP CSI-RS resource configurations in step 1001. In addition, CRI reporting configuration is also received. The manner in which CRI is calculated and reported depends on whether each NZP CSI-RS resource is configured with one port or not (step 1002). If at least one NZP CSI-RS resource is not configured with one port, a RI is calculated conditioned on the reported CRI in step 1006. For periodic PUCCH-based reporting, the RI is calculated conditioned on the last reported periodic CRI. CRI is reported at a time interval that is an integer multiple of a time interval associated with RI (step 1007). In addition, a CRI, when reported, is reported in a same UL subframe as a RI (step 1008). On the other hand, if each NZP CSI-RS resource is configured with one port, CRI is reported at a time interval that is an integer multiple of a time interval associated with CQI (step 1011). In addition, a CRI, when reported, is reported in an UL subframe separated by $N_{OFFSET,CRI}$ UL subframes from an UL subframe containing a CQI report (step 1012). The value of $N_{OFFSET,CRI}$ can be configured by higher layer signaling as a part of CRI reporting configuration.

Figure 11:
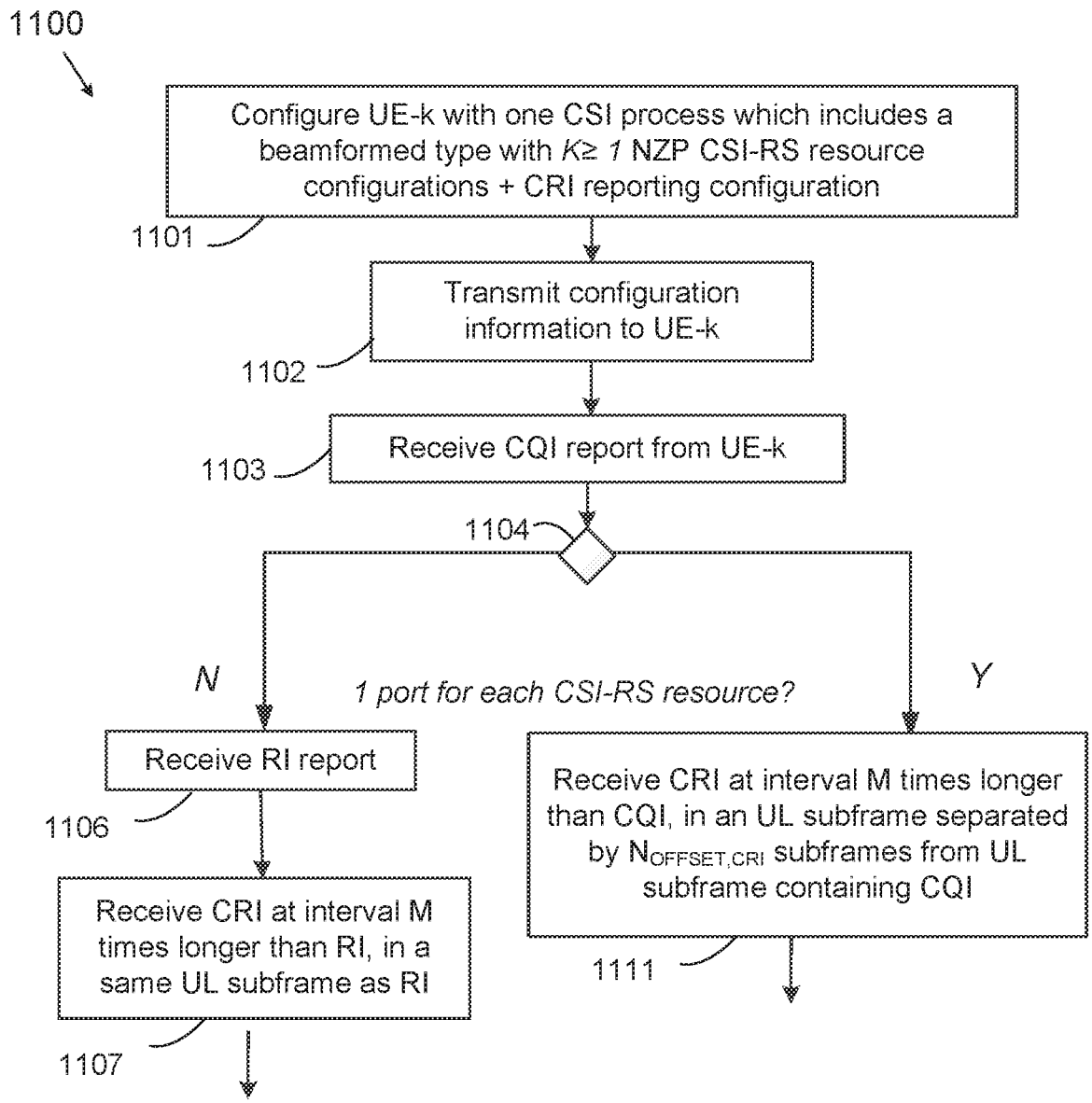
FIG. 11 illustrates an example method wherein an eNB configures a UE (labeled as UE-k) with one CSI process which includes at least one beamformed type with a plurality of NZP CSI-RS resource configurations according to various embodiments of the present disclosure.

FIG. 11 illustrates an example method 1100 wherein an eNB configures a UE (labeled as UE-k) with one CSI process which includes at least one beamformed type with a plurality of NZP CSI-RS resource configurations according to an embodiment of the present disclosure. For example, the method 1000 can be performed by the eNB 102.

The method 1100 begins with the eNB configuring a UE (labeled as UE-k) with one CSI process which includes at least one 'beamformed'/CLASS B eMIMO-Type with K>1 NZP CSI-RS resource configurations (in step 1101). In addition, the eNB configures UE-k with CRI reporting. The eNB transmits the configuration information to UE-k via higher-layer (RRC) signaling (step 1102). In turn, the eNB receives a CQI report from UE-k (step 1103) and decodes the content in accordance with the configuration information for UE-k. The CSI reporting parameters received by the eNB depend on whether each NZP CSI-RS resource is configured with one port or not (step 1104). If at least one NZP CSI-RS resource is not configured with one port, a RI is received in step 1106. For periodic PUCCH-based reporting, the RI is calculated conditioned on the last reported periodic CRI. CRI is reported by UE-k and received by the eNB at a time interval that is an integer multiple of a time interval associated with RI (step 1107). In addition, a CRI, when reported, is received in a same UL subframe as a RI (step 1107). On the other hand, if each NZP CSI-RS resource is configured with one port, CRI is reported by UE-k and received by the eNB at a time interval that is an integer multiple of a time interval associated with CQI (step 1111). In addition, a CRI, when reported, is received in an UL subframe separated by $N_{OFFSET}$ UL subframes from an UL subframe containing a CQI report (step 1111). The value of $N_{OFFSET,CRI}$ can be configured by higher layer signaling as a part of CRI reporting configuration.

Although FIGS. 10 and 11 illustrate examples of methods for receiving configuration information and configuring a UE, respectively, various changes could be made to FIGS. 10 and 11. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A method by a terminal in a wireless communication system, the method comprising:

receiving, from a base station, a first information on a channel state information reference signal (CSI-RS) configuration and second information on a CSI-RS resource indicator (CRI) reporting configuration, the CRI reporting configuration at least one of configuring the terminal to calculate a rank indicator (RI) conditioned on the CRI and configuring the terminal to report CRI at a time interval that is an integer multiple of one of a reporting time interval of the RI and a reporting time interval of a channel quality indicator (CQI);

determining a periodicity and an offset for a CRI reporting based on the second information, in case that a number of antenna ports in configured CSI-RS resources is one; and transmitting, to the base station, the CRI reporting based on the periodicity and the offset.

2. The method of claim 1, wherein the first information includes information on a type of the CSI-RS configuration and information on a plurality of non-zero-power (NZP) CSI-RS resources, and wherein the type of the CSI-RS configuration is a beam-formed CSI-RS.

3. The method of claim 1, wherein the CRI reporting is transmitted in a subframe satisfying $(10 \times n_f + \lfloor n_s/2 \rfloor - N_{OFFSET,CQI} - N_{OFFSET,CRI}) \bmod (N_{pd} \cdot M_{CRI}) = 0$, and wherein $n_f$ is a frame index, $n_s$ is a slot index, $N_{OFFSET,CQI}$ is a subframe offset for a channel quality indicator (CQI) reporting, $N_{OFFSET,CRI}$ is the offset for the CRI reporting, $N_{pd}$ is a periodicity for the CQI reporting, $N_{pd} \cdot M_{CRI}$ is the periodicity for the CRI reporting, and $M_{CRI}$ is an integer.

4. The method of claim 1, wherein the second information on the CRI reporting configuration includes a value, and the value is mapped to a value for the periodicity and a value for the offset.

5. A method by a base station in a wireless communication system, the method comprising:

transmitting, to a terminal, a first information on a channel state information reference signal (CSI-RS) configuration and second information on a CSI-RS resource indicator (CRI) reporting configuration, the CRI reporting configuration at least one of configuring the terminal to calculate a rank indicator (RI) conditioned on the CRI and configuring the terminal to report CRI at a time interval that is an integer multiple of one of a reporting time interval of the RI and a reporting time interval of a channel quality indicator (CQI); and receiving, from the terminal, a CRI reporting based on a periodicity and an offset for the CRI reporting determined based on the second information, in case that a number of antenna ports in configured CSI-RS resources is one.

6. The method of claim 5, wherein the first information includes information on a type of the CSI-RS configuration and information on a plurality of non-zero-power (NZP) CSI-RS resources, and wherein the type of the CSI-RS configuration is a beam-formed CSI-RS.

7. The method of claim 5, wherein the CRI reporting is received in a subframe satisfying $(10 \times n_f + \lfloor n_s/2 \rfloor - N_{OFFSET,CQI} - N_{OFFSET,CRI}) \bmod (N_{pd} \times M_{CRI}) = 0$, wherein $n_f$ is a frame index, $n_s$ is a slot index, $N_{OFFSET,CQI}$ is a subframe offset for a channel quality indicator (CQI) reporting, $N_{OFFSET,CRI}$ is the offset for the CRI reporting, $N_{pd}$ is a periodicity for the CQI reporting, $N_{pd} \cdot M_{CRI}$ is the periodicity for the CRI reporting, and $M_{CRI}$ is an integer, and wherein the information second on the CRI reporting includes a value, and the value is mapped to a value for the periodicity and a value for the offset.

8. A terminal in a wireless communication system, the terminal comprising:

a transceiver configured to transmit and receive a signal; and a controller coupled with the transceiver and configured to:

receive, from a base station, a first information on a channel state information reference signal (CSI-RS) configuration and second information on a CSI-RS resource indicator (CRI) reporting configuration, the CRI reporting configuration at least one of configuring the terminal to calculate a rank indicator (RI) conditioned on the CRI and configuring the terminal to report CRI at a time interval that is an integer multiple of one of a reporting time interval of the RI and a reporting time interval of a channel quality indicator (CQI), determine a periodicity and an offset for a CRI reporting based on the second information, in case that a number of antenna ports in configured CSI-RS resources is one, and transmit, to the base station, the CRI reporting based on the periodicity and the offset.

9. The terminal of claim 8, wherein the first information includes information on a type of the CSI-RS configuration and information on a plurality of non-zero-power (NZP) CSI-RS resources, and wherein the type of the CSI-RS configuration is a beam-formed CSI-RS.

10. The terminal of claim 8, wherein the CRI reporting is transmitted in a subframe satisfying $(10 \times n_f + \lfloor n_s/2 \rfloor - N_{OFFSET,CQI} - N_{OFFSET,CRI}) \bmod (N_{pd} \times M_{CRI}) = 0$, and wherein $n_f$ is a frame index, $n_s$ is a slot index, $N_{OFFSET,CQI}$ is a subframe offset for a channel quality indicator, CQI, reporting, $N_{OFFSET,CRI}$ is the offset for the CRI reporting, $N_{pd}$ is a periodicity for the CQI reporting, $N_{pd} \cdot M_{CRI}$ is the periodicity for the CRI reporting, and $M_{CRI}$ is an integer.

11. The terminal of claim 8, wherein the second information on the CRI reporting configuration includes a value, and the value is mapped to a value for the periodicity and a value for the offset.

12. A base station in a wireless communication system, the base station comprising:

a transceiver configured to transmit and receive a signal; and a controller coupled with the transceiver and configured to:

transmit, to a terminal, a first information on a channel state information reference signal (CSI-RS) configuration and second information on a CSI-RS resource indicator (CRI) reporting configuration, the CRI reporting configuration at least one of configuring the terminal to calculate a rank indicator (RI) conditioned on the CRI and configuring the terminal to report CRI at a time interval that is an integer multiple of one of a reporting time interval of the RI and a reporting time interval of a channel quality indicator (CQI), and receive, from the terminal, a CRI reporting based on a periodicity and an offset for the CRI reporting determined based on the second information, in case that a number of antenna ports in configured CSI-RS resources is one.

13. The base station of claim 12, wherein the first information includes information on a type of the CSI-RS configuration and information on a plurality of non-zero-power (NZP) CSI-RS resources, and wherein the type of the CSI-RS configuration is a beamformed CSI-RS.

14. The base station of claim 12, wherein the CRI reporting is received in a subframe satisfying $(10 \times n_f + \lfloor n_s/2 \rfloor - N_{OFFSET,CQI} - N_{OFFSET,CRI}) \bmod (N_{pd} \times M_{CRI}) = 0$, and wherein $n_f$ is a frame index, $n_s$ is a slot index, $N_{OFFSET,CQI}$ is a subframe offset for a channel quality indicator (CQI) reporting, $N_{OFFSET,CRI}$ is the offset for the CRI reporting, $N_{pd}$ is a periodicity for the CQI reporting, $N_{pd} \cdot M_{CRI}$ is the periodicity for the CRI reporting, and $M_{CRI}$ is an integer.

15. The base station of claim 12, wherein the second information on the CRI reporting configuration includes a value, and the value is mapped to a value for the periodicity and a value for the offset.

* * * * *